(12) United States Patent  
Murayama

(10) Patent No.: US 8,886,419 B2  
(45) Date of Patent: Nov. 11, 2014

(54) AUTOMATIC TRANSMISSION APPARATUS AND STRADDLE-TYPE VEHICLE EQUIPPED WITH THE APPARATUS

(71) Applicant: Yamaha Hatsudoki Kabushiki Kaisha, Iwata (JP)

(72) Inventor: Takuya Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 142 days.

(21) Appl. No.: 13/688,291

(22) Filed: Nov. 29, 2012

(65) Prior Publication Data

US 2014/0046554 A1 Feb. 13, 2014

(30) Foreign Application Priority Data

Aug. 10, 2012 (JP) .................. 2012-178439

(51) Int. Cl.
| | |
|---|---|
| *G06F 17/00* | (2006.01) |
| *G06F 19/00* | (2011.01) |
| *B60W 10/02* | (2006.01) |
| *B60W 10/06* | (2006.01) |
| *F16H 61/68* | (2006.01) |
| *B60W 30/18* | (2012.01) |
| *F16H 63/50* | (2006.01) |
| *F16H 61/04* | (2006.01) |

(52) U.S. Cl.
CPC .............. *F16H 61/68* (2013.01); *B60W 30/18* (2013.01); *F16H 63/502* (2013.01); *F16H 61/0437* (2013.01)
USPC .................. 701/51; 701/54; 701/68

(58) Field of Classification Search
USPC ............... 701/51, 53, 54, 58, 64, 66, 67, 68; 192/103 F, 103 C; 74/730.1, 731.1, 74/732.1, 733.1
See application file for complete search history.

(56) References Cited

U.S. PATENT DOCUMENTS

| | | | |
|---|---|---|---|
| 7,445,578 B2 * | 11/2008 | Tabata et al. ...................... 477/3 |
| 2006/0080020 A1 * | 4/2006 | Iriyama et al. .................. 701/54 |
| 2006/0124422 A1 | 6/2006 | Zenno | |
| 2007/0288151 A1 * | 12/2007 | Kadono et al. .................. 701/54 |
| 2008/0153667 A1 * | 6/2008 | Ishii et al. ...................... 477/115 |
| 2009/0156359 A1 * | 6/2009 | Tabata et al. .................. 477/108 |

FOREIGN PATENT DOCUMENTS

JP 2006-170225 A 6/2006

* cited by examiner

*Primary Examiner* — Thomas Tarcza  
*Assistant Examiner* — Edward Pipala  
(74) *Attorney, Agent, or Firm* — Keating & Bennett, LLP

(57) ABSTRACT

An automatic transmission apparatus includes a clutch including a drive side rotator to which torque of an engine is transmitted and a driven side rotator, a multi-gear transmission mechanism including a dog clutch, at least one actuator to drive the clutch and the transmission mechanism, a torque changing device to change the torque of the engine, a gear shifting command output device to output a gear shifting command, and a transmission control system to control the at least one actuator and the torque changing device. The transmission control system includes a shock reduction control unit to execute control to, upon receiving the gear shifting command from the gear shifting command output device, reduce the engine torque by controlling the torque changing device and thereafter to start to disengage the clutch by controlling the at least one actuator.

12 Claims, 10 Drawing Sheets

AUTOMATIC TRANSMISSION APPARATUS AND STRADDLE-TYPE VEHICLE EQUIPPED WITH THE APPARATUS

BACKGROUND OF THE INVENTION

1. Field of the Invention

The present invention relates to an automatic transmission apparatus and a straddle-type vehicle including the automatic transmission apparatus.

2. Description of the Related Art

Automatic transmission apparatuses equipped with a multi-geared type transmission mechanism having a dog clutch, a clutch, and one or two actuators for driving the clutches and the transmission mechanism are conventionally known. In the automatic transmission apparatus, a control device such as an Electronic Control Unit (ECU) outputs a gear shifting command according to the driving condition of a straddle-type vehicle, or the rider allows the gear shifting command to output by operating a shift switch or the like, so that the actuator is driven. The actuator performs a series of operations, such as causing the clutch to disengage, subsequently changing the gear position of the transmission mechanism, and thereafter causing the clutch to engage.

When the clutch is disengaged, a rotational speed difference arises between a drive side rotator and a driven side rotator of the clutch. When the rotational speed difference is large in the clutch just before the engagement, a shock occurs at the time of engagement of the clutch. JP 2006-170225 discloses a technique for reducing such a shock. The automatic transmission apparatus described in JP 2006-170225 detects a rotational speed difference between the drive side rotator and the driven side rotator and adjusts the engagement speed of the clutch according to the rotational speed difference.

However, a shock also occurs when disengaging the clutch. The details are as follows. The clutch is engaged before shifting gears. Therefore, torque is transmitted from the drive side rotator to the driven side rotator, and mechanical power is transmitted to the driving wheel. However, when the clutch is disengaged at the time of shifting gears, the torque transmitted to the driven side rotator is lost. As a consequence, the mechanical power is no longer transmitted to the driving wheel. If the torque is abruptly lost, the mechanical power transmitted to the driving wheel is instantly lost. Such an abrupt loss of the drive force can be a shock that impairs the riding comfort for the rider. Although the above-mentioned conventional technique aims at reducing the shock at the time of engaging the clutch, it does not address a shock at the time of disengaging the clutch.

SUMMARY OF THE INVENTION

Preferred embodiments of the present invention provide an automatic transmission apparatus that significantly reduces a shock at the time of disengaging the clutch.

An automatic transmission apparatus according to a preferred embodiment of the present invention includes a clutch including a drive side rotator to which an engine torque is transmitted and a driven side rotator arranged to contact with and separate from the drive side rotator; a multi-geared type transmission mechanism including a dog clutch and disposed between the driven side rotator of the clutch and a driving wheel of a straddle-type vehicle; at least one actuator arranged to drive the clutch and the transmission mechanism; a torque changing device arranged to change the engine torque; a gear shifting command output device arranged to output a gear shifting command; and a transmission control system arranged and programmed to control the at least one actuator and the torque changing device. The transmission control system includes a shock reduction control unit arranged and programmed to execute a control process of, upon receiving the gear shifting command from the gear shifting command output device, reducing the engine torque by controlling the torque changing device and thereafter starting to disengage the clutch by controlling the at least one actuator.

When the transmission control system is equipped with a shock reduction control unit as described above, the engine torque decreases before disengaging the clutch. Therefore, the difference in the drive force applied to the driving wheel before and after disengaging the clutch can be kept small. Accordingly, it is possible to prevent the abrupt loss of the drive force at the time of disengaging the clutch. As a result, the shock at the time of disengaging the clutch can be alleviated.

In another preferred embodiment of the present invention, the shock reduction control unit controls the at least one actuator so as to start to change a gear position of the transmission mechanism at the same time as or after starting to disengage the clutch.

Since changing of the gear position is started at the same time as or after disengaging the clutch, the engine torque can be reduced by the torque changing device prior to changing the gear position.

In another preferred embodiment of the present invention, the torque changing device is an electronic throttle valve provided for the engine. The shock reduction control unit reduces the engine torque by reducing an opening of the electronic throttle valve.

By reducing the opening of the throttle valve in this way, the air intake amount to the engine is adjusted, so that the engine torque can be reduced. This makes it possible to prevent the abrupt loss of the drive force at the time of disengaging the clutch more suitably. As a result, the shock at the time of disengaging the clutch can be alleviated more suitably.

In another preferred embodiment of the present invention, the straddle-type vehicle includes an accelerator operator to be operated by a rider. The shock reduction control unit is arranged and programmed to set a time from when starting to reduce the opening of the electronic throttle valve to when starting to disengage the clutch to be a first time, if an operation amount of the accelerator operator is a first operation amount when receiving the gear shifting command from the gear shifting command output device; and set the time from when starting to reduce the opening of the electronic throttle valve to when starting to disengage the clutch to be a second time that is shorter than the first time, if the operation amount of the accelerator operator is a second operation amount that is greater than the first operation amount when receiving the gear shifting command.

The shock reduction control unit makes it possible to appropriately change the time from when starting to reduce the opening of the electronic throttle valve to when starting to disengage the clutch according to the acceleration request by the rider. In addition, when the acceleration request by the rider is greater, the above-mentioned time becomes shorter, so gear shifting time can be shortened.

In another preferred embodiment of the present invention, the straddle-type vehicle includes an accelerator operator to be operated by a rider. The shock reduction control unit is arranged and programmed to reduce the opening of the electronic throttle valve at a first rate, if an operation amount of the accelerator operator is a first operation amount when receiving the gear shifting command from the gear shifting command output device; and reduce the opening of the electronic throttle valve at a second rate that is lower than the first rate, if the operation amount of the accelerator operator is a second operation amount that is greater than the first operation amount when receiving the gear shifting command.

The shock reduction control unit makes it possible to appropriately change the rate of reducing the opening of the electronic throttle valve according to the acceleration request by the rider. When the acceleration request by the rider is greater, the rider demands quicker acceleration. Accordingly, when the acceleration request by the rider is greater, the opening of the throttle valve is reduced at a slower rate, so that abrupt reduction of the drive force can be prevented.

In another preferred embodiment of the present invention, the straddle-type vehicle includes an accelerator operator to be operated by a rider. The shock reduction control unit is arranged and programmed to set an opening that the electronic throttle valve reaches from when starting to reduce the opening of the electronic throttle valve to when starting to disengage the clutch to be a first opening, if an operation amount of the accelerator operator is a first operation amount when receiving the gear shifting command from the gear shifting command output device; and set the opening that the electronic throttle valve reaches from when starting to reduce the opening of the electronic throttle valve to when starting to disengage the clutch to be a second opening that is greater than the first opening, if the operation amount of the accelerator operator is a second operation amount that is greater than the first operation amount when receiving the gear shifting command.

The shock reduction control unit makes it possible to appropriately change the opening that the electronic throttle valve reaches from when starting to reduce the opening of the electronic throttle valve to when starting to disengage the clutch according to the acceleration request by the rider. When the acceleration request by the rider is greater, the rider demands quicker acceleration. Accordingly, when the acceleration request by the rider is greater, the opening that the electronic throttle valve reaches when starting to disengage the clutch is set to be greater, so that abrupt reduction of the drive force can be prevented.

In another preferred embodiment of the present invention, the straddle-type vehicle includes an accelerator operator to be operated by a rider. The transmission control system includes a determining unit arranged to determine whether or not an operation amount of the accelerator operator is equal to or greater than a threshold value when receiving the gear shifting command from the gear shifting command output device; and a normal control unit arranged and programmed to execute a normal control process of, upon receiving the gear shifting command from the gear shifting command output device, reducing the engine torque by the torque changing device at the same time as or after starting to disengage the clutch. The transmission control system executes the normal control process by the normal control unit in place of the control process by the shock reduction control unit, if the determining unit determines that the operation amount is equal to or greater than the threshold value.

With such a configuration, the control procedure can be changed appropriately according to the acceleration request by the rider. In addition, when the acceleration request by the rider is greater, the normal control process is executed, so that the acceleration time can be shortened.

In another preferred embodiment of the present invention, the torque changing device preferably is an ignition device provided in the engine. The shock reduction control unit reduces the engine torque by performing an ignition timing retard control process for the ignition device.

When the fuel ignition timing for the engine is delayed by executing the ignition timing retard control process in this way, the engine torque can be reduced before disengaging the clutch. This makes it possible to prevent the abrupt loss of the drive force at the time of disengaging the clutch more suitably and at the same time to reduce the shock at the time of disengaging the clutch more suitably.

In another preferred embodiment of the present invention, the torque changing device preferably is a fuel supply system that supplies fuel to the engine. The shock reduction control unit reduces the engine torque by controlling a fuel supply amount or fuel supply timing of the fuel supply system.

When the fuel supply amount or fuel supply timing of the fuel supply system is controlled in this way, the engine torque can be reduced before disengaging the clutch. This makes it possible to prevent the abrupt loss of the drive force at the time of disengaging the clutch more suitably and at the same time to reduce the shock at the time of disengaging the clutch more suitably.

In another preferred embodiment of the present invention, the gear shifting command output device preferably is a control device arranged and programmed to output the gear shifting command according to a driving condition of the straddle-type vehicle.

With the control device that outputs a gear shifting command, gear shifting is performed irrespective of the rider's intention. With the above-described configuration, the engine torque is reduced before disengaging the clutch, so an advance sign for the gear shifting can be generated in advance. By receiving the advance sign, the rider can prepare for the gear shifting in advance. As a result, the rider can easily obtain a connected feel with the vehicle.

In another preferred embodiment of the present invention, the automatic transmission apparatus also preferably includes a notification device arranged to provide notification by visual indication, sound, or vibration when the shock reduction control unit executes the control process.

This allows the rider to obtain an advance sign of gear shifting visually, auditorily, or physically, for example.

In another preferred embodiment of the present invention, a straddle-type vehicle including the automatic transmission apparatus with the above-described configuration is provided.

This makes it possible to provide a straddle-type vehicle including an automatic transmission apparatus that can lessen a shock at the time of disengaging the clutch.

Preferred embodiments of the present invention provide an automatic transmission apparatus that significantly reduces a shock at the time of disengaging the clutch.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, preferred embodiments of the present invention will be described. It should be noted that the other matters not specifically mentioned in this description but necessary to implement the present invention can be understood as design variations by a skilled person based on the prior art in the technical field. The present invention may be implemented based on the content disclosed herein and the common technical knowledge in the field.

Figure 1:
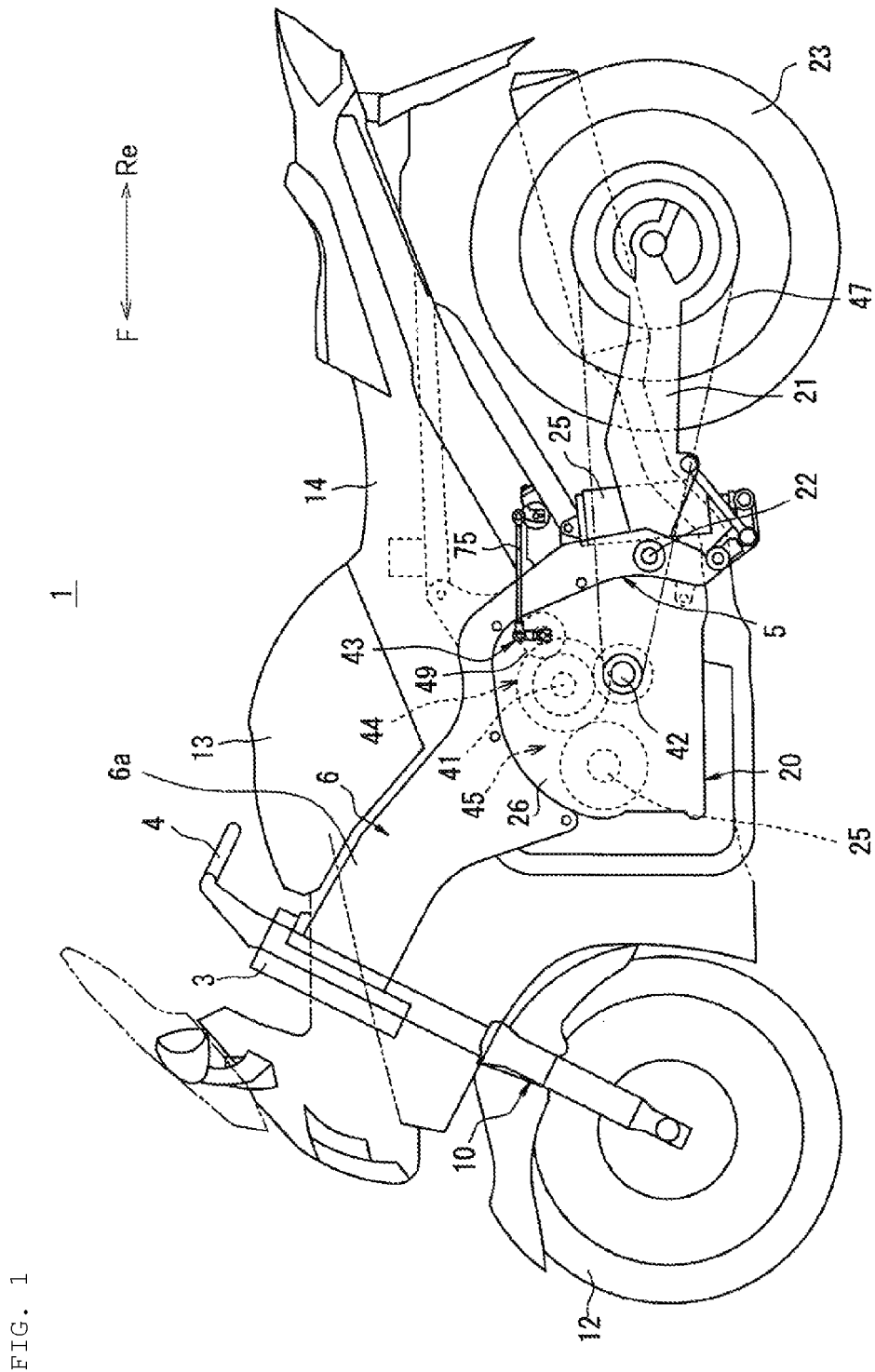
FIG. 1 is a side view of a motorcycle according to a first preferred embodiment of the present invention.

Hereinbelow, a motorcycle equipped with an automatic transmission apparatus according to a preferred embodiment of the present invention will be described with reference to the drawings. FIG. 1 is a side view illustrating a motorcycle 1. In the present description, the terms "front," "rear," "left," and "right" respectively refer to front, rear, left, and right as defined based on the perspective of the rider seated on a later-described seat 14. Reference characters F and Re in the drawings indicate front and rear, respectively.

The motorcycle 1 is one example of the straddle-type vehicle according to the present preferred embodiment. The motorcycle 1 preferably is what is called an on-road type motorcycle. For example, the straddle-type vehicle according to a preferred embodiment of the present invention may be any type of motorcycle including an off-road type motorcycle, a sport bike type motorcycle, a scooter type motorcycle, and a moped type motorcycle. The straddle-type vehicle according to the present invention is not limited to the motorcycle 1. For example, the straddle-type vehicle according to the present invention may be an ATV, a four-wheeled all-terrain vehicle, and the like.

As illustrated in FIG. 1, the motorcycle 1 includes a head pipe 3 and a body frame 6. The body frame 6 includes a pair of left and right frame unit 6a extending rearward the head pipe 3. In FIG. 1, of the frame portions, only the frame portion 6a is depicted. A rear portion of the frame portion 6a extends downward. A rear-arm bracket 5 is connected to a rear portion of the frame portion 6a. A front end portion of a rear arm 21 is connected to the rear-arm bracket 5 via a pivot shaft 22. The rear arm 21 is supported vertically swingably by the pivot shaft 22. A rear wheel 23 is supported at a rear end portion of the rear arm 21.

A fuel tank 13 is disposed above the frame portion 6a. A seat 14 for the rider to be seated is disposed at the rear of the fuel tank 13.

A front fork 10 is supported rotatably by the head pipe 3. A handle bar 4 is provided at the upper end of the front fork 10. A front wheel 12 is provided rotatably at a lower end of the front fork 10. A power unit 20 is mounted on the frame portion 6a and the rear-arm bracket 5 in a suspended manner.

Figure 2:
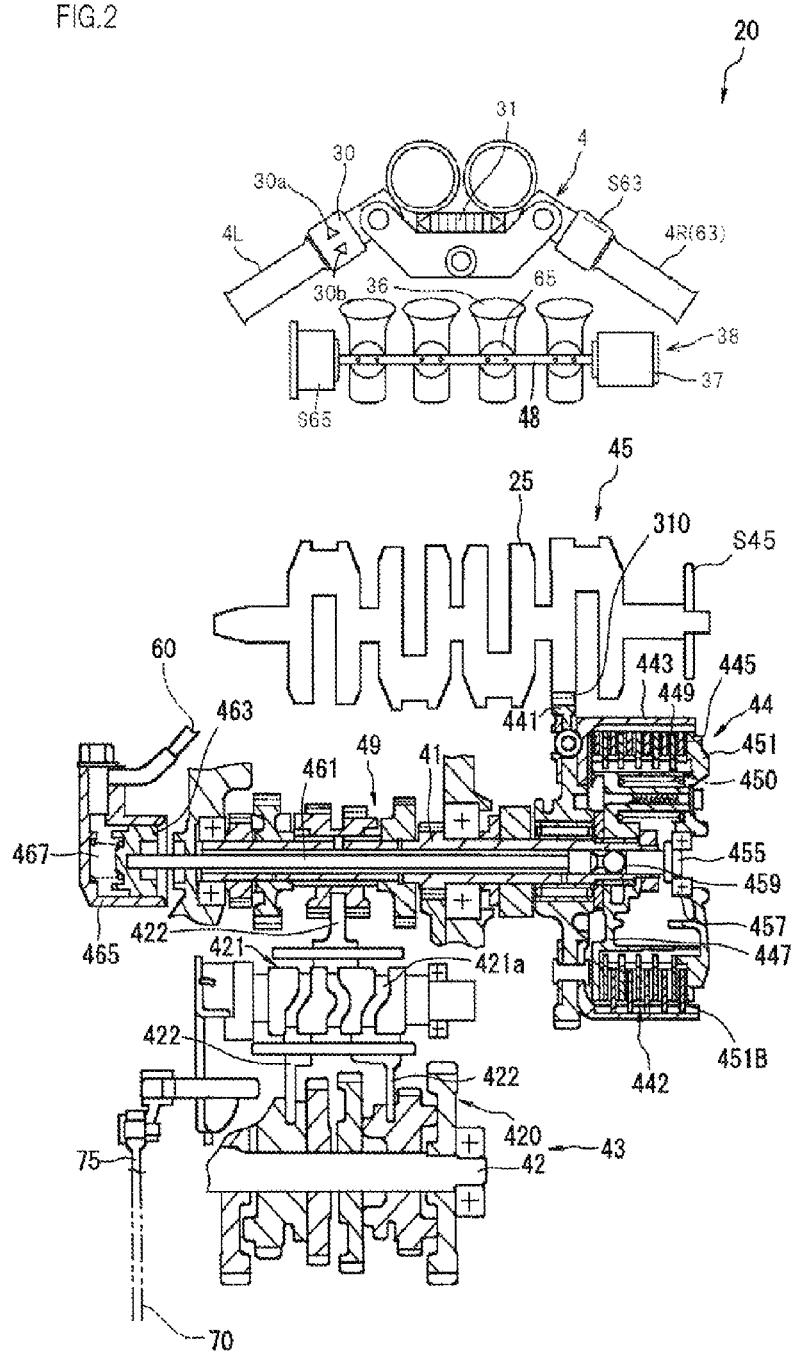
FIG. 2 is a configuration diagram illustrating a drive system of the motorcycle shown in FIG. 1.

FIG. 2 is a configuration diagram illustrating a drive system of the motorcycle 1 shown in FIG. 1. A right grip 4R of the handlebar 4 includes an accelerator 63. An accelerator opening sensor S63 is fitted to the accelerator 63. The accelerator opening sensor S63 detects the operation amount of the accelerator 63 by the rider (i.e., throttle opening). A shift switch 30 is provided on a left grip 4L side of the handlebar 4. The shift switch 30 includes a shift-up switch 30a and a shift-down switch 30b. The shift switch 30 can increase or decrease the shift position from between neutral and the top gear position (for example, the 6-th gear position) by manual operation. An indicator 31 that visually indicates the current shift position or the like is provided at a center portion of the handlebar 4.

A throttle valve 65 is fitted to a throttle 36, which defines an intake passage. A throttle drive actuator 37 is provided at the right end of a valve shaft 48 of the throttle valve 65. The throttle valve 65 is driven by the throttle drive actuator 37. The throttle valve 65 preferably is an electronic throttle valve. The throttle valve 65 is configured to be electronically controlled by the throttle drive actuator 37. A throttle opening sensor S65 is provided at the left end of the valve shaft 48 of the throttle valve 65. The throttle drive actuator 37 and the throttle opening sensor S65 constitute a DBW (drive-by-wire) 38. The DBW 38 is arranged to cause the throttle valve 65 to open and close by the throttle drive actuator 37 according to the detection result by the throttle opening sensor S65.

As illustrated in FIG. 2, the power unit 20 at least includes an engine 45, a clutch 44, and a transmission mechanism 43. The engine 45, the clutch 44, and the transmission mechanism 43 preferably are assembled integrally to a crankcase 26 (see FIG. 1).

The engine 45 according to the present preferred embodiment preferably is an internal combustion engine that uses gasoline as the fuel, for example. However, the engine 45 is not limited to the internal combustion engine such as a gasoline engine. The engine 45 may be an electric motor engine or the like, for example. The engine 45 may also be one in which a gasoline engine and an electric motor engine are combined. The engine 45 includes a crankshaft 25.

The crankshaft 25 outputs the torque of the engine 45. The power unit 20 includes a main shaft 41 and a drive shaft 42. The crankshaft 25 is coupled to a main shaft 41 via the clutch 44. The main shaft 41 is arranged parallel or substantially parallel to the crankshaft 25. The main shaft 41 is also arranged parallel or substantially parallel to a drive shaft 42.

The clutch 44 in the present preferred embodiment preferably is a multiple friction plate clutch. The clutch 44 includes a clutch housing 443 and a clutch boss 447. A plurality of friction plates 445 are provided in the clutch housing 443. A plurality of clutch plates 449 are provided outside the clutch boss 447. Each of the friction plates 445 rotates together with the clutch housing 443. Each of the friction plates 445 is displaceable with respect to the axial direction of the main shaft 41. The friction plates 445 are arrayed along the axial direction of the main shaft 41. The friction plate 445 constitutes the "drive side rotator" in the clutch 44.

Each of the clutch plates 449 faces an adjacent one of the friction plates 445. Each of the clutch plates 449 rotates together with the clutch boss 447. Each of the clutch plates 449 is displaceable with respect to the axial direction of the main shaft 41. The clutch plate 449 constitutes the "driven side rotator" in the clutch 44. In the present preferred embodiment, the plurality of friction plates 445 and the plurality of clutch plates 449 define a plate assembly 442.

As illustrated in FIG. 2, a pressure plate 451 is disposed vehicle-widthwise outward of the main shaft 41 (i.e., on the right in FIG. 2). The pressure plate 451 preferably is substantially disc-shaped. A pressing portion 451B projecting toward the plate assembly 442 side is provided in a radially outward portion of the pressure plate 451. The pressing portion 451B faces the friction plate 445 that is located on the rightmost side of the plate assembly 442.

The clutch 44 is provided with a spring 450. The spring 450 urges the pressure plate 451 vehicle-widthwise inwardly (i.e., leftward in FIG. 2). In other words, the spring 450 urges the pressure plate 451 in a direction in which the pressing portion 451B presses the plate assembly 442.

A center portion of the pressure plate 451 is engaged with one end portion (the right end portion in FIG. 2) of a push rod 455 via a bearing 457. This allows the pressure plate 451 to be rotatable relative to the push rod 455. Note that the main shaft 41 preferably has a tubular shape. The other end portion (the left end portion) of the push rod 455 is accommodated inside the main shaft 41. Inside the main shaft 41, a spherical ball 459 is provided adjacent to the other end portion (the left end portion) of the push rod 455. Further inside the main shaft 41, a push rod 461 is provided adjacently to the ball 459.

A left end portion of the push rod 461 protrudes from the main shaft 41. A piston 463 is provided integrally with the left end portion of the push rod 461. The piston 463 is guided by the cylinder main body 465, and it is slidable in the axial directions of the main shaft 41.

The clutch 44 is driven preferably by a clutch actuator 60. In the present preferred embodiment, the clutch actuator 60 preferably is an electric motor, but the clutch actuator 60 is not limited to the electric motor. The clutch actuator 60 drives the clutch 44 so that the clutch 44 can be engaged and disengaged. When the clutch actuator 60 is actuated, lubrication oil is supplied into a space 467 surrounded by the piston 463 and the cylinder main body 465. When lubrication oil is supplied into the space 467, the piston 463 is pushed and shifted rightward in FIG. 2. Thereby, the piston 463 pushes the pressure plate 451 rightward in FIG. 2, via the push rod 461, the ball 459, the push rod 455, and the bearing 457. When the pressure plate 451 is pushed rightward in FIG. 2, the pressing portion 451B of the pressure plate 451 is separated from the friction plates 445, and the clutch 44 is brought into a disengaged state.

At the time when the clutch 44 is engaged, the pressure plate 451 is moved leftward in FIG. 2 by the spring 450. When the pressure plate 451 moves leftward in FIG. 2, the pressing portion 451B presses the plate assembly 442 leftward. As a result, the friction plates 445 and the clutch plates 449 in the plate assembly 442 are brought into pressure contact with each other. Thereby, the clutch 44 is brought into an engaged state.

On the other hand, in the disengaged state of the clutch 44, the pressure plate 451 is moved rightward in FIG. 2 by the push rod 451. Then, the pressing portion 451B of the pressure plate 451 is separated from the plate assembly 442. In the state in which the pressing portion 451B is separated from the plate assembly 442, the friction plates 445 and the clutch plates 449 are not in pressure contact with each other. A slight clearance is provided between each of the friction plates 445 and each of the clutch plates 449. Therefore, a friction force that can transmit a drive force does not occur between the friction plates 445 and the clutch plates 449.

Thus, the pressure plate 451 moves in one of the axial directions of the main shaft 41 or in the other direction according to the magnitude relationship between the drive force of the clutch actuator 60 and the urging force of the spring 450. According to the above-described movement, the clutch 44 is brought into an engaged state or a disengaged state.

A gear 310 is supported integrally on the crankshaft 25 of the engine 45. A gear 441 that meshes with the gear 310 is supported on the main shaft 41. The gear 441 is rotatable relative to the main shaft 41. The gear 441 is provided integrally with, for example, the clutch housing 443. As a result, the torque of the engine 45 is transmitted from the crankshaft 25 via the gear 441 to the clutch housing 443. Also, the torque of the engine 45 is transmitted the clutch housing 443 to the clutch boss 447 by the friction force produced between the plurality of friction plates 445 and the plurality of clutch plates 449. The clutch boss 447 and the main shaft 41 rotate integrally with each other. This means that there is no relative rotation between the clutch boss 447 and the main shaft 41. Therefore, when the clutch 44 is engaged, the torque of the engine 45 is transmitted to the main shaft 41.

The push rod 455 is not limited to a push rod that pushes the pressure plate 451 rightward in FIG. 2 by a mechanism inserted in the main shaft 41. The push rod 455 may be a push rod that pulls the pressure plate 451 rightward in FIG. 2 by a mechanism provided vehicle-widthwise outward (i.e., rightward in FIG. 2) of the pressure plate 451.

The clutch 44 may not be a multiple plate clutch but may be a single plate clutch, for example. The clutch 44 may also be provided with a centrifugal weight. In this case, the clutch 44 is engaged/disengaged by actuation of the clutch actuator 60 and the centrifugal force of the centrifugal weight.

Next, the configuration of the transmission mechanism 43 will be described in detail. The transmission mechanism 43 according to the present preferred embodiment preferably is what is called a dog clutch type transmission mechanism, and a multi-speed type transmission mechanism, for example. The transmission mechanism 43 is disposed on a power transmission path to transmit the mechanical power of the engine 45 to the rear wheel 23 (see FIG. 1), between the friction plates 445 of the clutch 44 and the rear wheel 23. The transmission mechanism 43 includes later-described transmission gears 49 and 420, a shift drum 421, a shift fork 422, a shift actuator 70, and so forth.

A plurality of transmission gears 49 are attached to the main shaft 41. On the other hand, a plurality of transmission gears 420 that correspond to the above-mentioned plurality of transmission gears 49 are attached to the drive shaft 42. Each of the transmission gears 49 and each of the transmission gears 420 include an engaging portion including a protrusion protruding in an axial direction of the main shaft 41 or a recess recessed in an axial direction of the main shaft 41. Of the plurality of transmission gears 49 and the plurality of transmission gears 420, only selected one or more of the transmission gears 49 and 420 are engaged with each other. The engaging portions of the transmission gears 49 and the transmission gears 420 overlap with each other with respect to the axial direction of the main shaft 41, such that the transmission gears 49 and the transmission gears 420 are engaged with each other. At least one of the transmission gears 49 other than the selected one of the transmission gears 49 and the transmission gears 420 other than the selected one of the transmission gears 420 is allowed to be rotatable relative to the main shaft 41 or the drive shaft 42. In other words, at least one of the non-selected transmission gears 49 and the non-selected transmission gears 420 is allowed to spin freely relative to the main shaft 41 or the drive shaft 42. The transmission of rotation between the main shaft 41 and the drive shaft 42 is carried out only through the selected transmission gear 49 and the selected transmission gear 420 that mesh with each other.

The selection of the transmission gear 49 and the transmission gear 420 is performed by the shift drum 421. According to the rotation of the shift drum 421, the combination of the transmission gears 49 and 420 that engage with each other is changed. A plurality of cam grooves 421a are located in the outer circumferential surface of the shift drum 421. A shift fork 422 is fitted to each of the cam grooves 421a. Each shift fork 422 engages with a predetermined transmission gear 49 of the main shaft 41 and a predetermined transmission gear 420 of the drive shaft 42. In response to rotation of the shift drum 421, each of the plurality of the shift forks 422 is guided by the cam grooves 421a to move in an axial direction of the main shaft 41. As a result, of the transmission gears 49 and 420, the gears to be engaged with each other are selected. More specifically, of the plurality of transmission gears 49 and the plurality of transmission gears 420, only the pair of gears that is located at the position corresponding to the rotation angle of the shift drum 421 is brought into a fixed state relative to the main shaft 41 and the drive shaft 42 by a spline. Thereby, the gear position in the transmission mechanism 43 is determined. As a result, the transmission of rotation is carried out between the main shaft 41 and the drive shaft 42 through the transmission gear 49 and the transmission gear 420 at a predetermined transmission gear ratio. The shift drum 421 is rotated only by a predetermined angle by a shift rod 75 moving back and forth.

Switching of the transmission gears of the transmission mechanism 43, in other words, a change of the gear position of the transmission mechanism 43, is performed by the shift actuator 70. In the present preferred embodiment, the shift actuator 70 preferably is an electric motor. However, the shift actuator 70 is not limited to the electric motor. The shift actuator 70 is connected to the shift drum 421 via the shift rod 75. The shift actuator 70 changes the combination of the transmission gears 49 and 420 that engage with each other by rotating the shift drum 421. The shift rod 75 is driven by the shift actuator 70 to thereby move back and forth.

With such a configuration as described above, when the engine 45 is operated under the condition in which a predetermined pair of transmission gear 49 and transmission gear 420 are fixed respectively to the main shaft 41 and the drive shaft 42 and the clutch 44 is brought into an engaged state, the torque of the engine 45 is transmitted to the main shaft 41 via the clutch 44. Also, the transmission of rotation is carried out at a predetermined transmission gear ratio between the main shaft 41 and the drive shaft 42 via the predetermined pair of transmission gear 49 and transmission gear 420, so that the drive shaft 42 is rotated. When the drive shaft 42 is rotated, the torque is transmitted by a power transmission mechanism 47 (see FIG. 1) that connects the drive shaft 42 to a rear wheel 23 (see FIG. 1), so that the rear wheel 23 is rotated.

Figure 3:
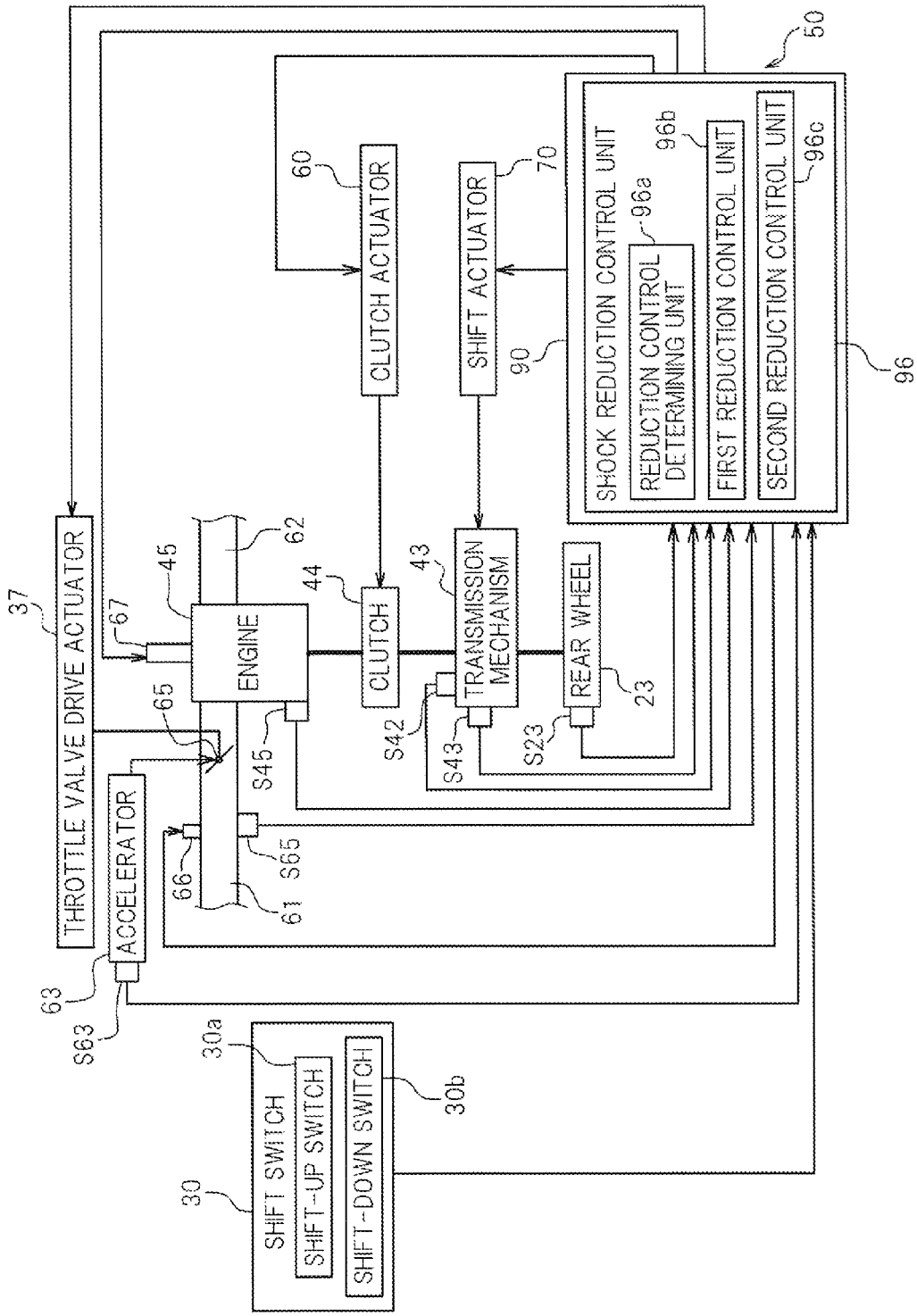
FIG. 3 is a block diagram illustrating main elements of the motorcycle according to the first preferred embodiment of the present invention.

FIG. 3 is a block diagram showing main elements of the motorcycle 1. The motorcycle 1 includes the engine 45, the clutch 44, and the transmission mechanism 43. An intake pipe 61 and an exhaust pipe 62 are connected to the engine 45. The engine 45 is provided with an ignition device 67. A throttle valve 65 is disposed in the intake pipe 61. The throttle valve 65 adjusts the amount and speed of the air flowing through the intake pipe 61. A fuel supply system 66 arranged to supply fuel is provided on the intake pipe 61. The type of the fuel supply system 66 is not particularly limited. A fuel injection system, a carburetor, or the like may be suitably used for the fuel supply system 66.

Next, an automatic transmission apparatus 50 according to the present preferred embodiment will be described below. As illustrated in FIG. 3, the automatic transmission apparatus 50 includes the clutch 44, the transmission mechanism 43, the throttle valve 65, the clutch actuator 60, the shift actuator 70, the throttle drive actuator 37, and the shift switch 30. The automatic transmission apparatus 50 also includes an ECU (Electric Control Unit) 90. In various preferred embodiments of the present invention, the ECU 90 preferably constitutes the transmission control system. The ECU 90 controls the engine 45, etc., in addition to the clutch actuator 60, the shift actuator 70, and the throttle drive actuator 37.

The automatic transmission apparatus 50 includes the previously-mentioned accelerator opening sensor S63, an engine rotational speed sensor S45, the throttle opening sensor S65, a vehicle speed sensor S23, an output shaft rotational speed sensor S42, and a gear position sensor S43. As described previously, the accelerator opening sensor S63 is provided on the accelerator 63. The accelerator opening sensor S63 detects the operation amount of the accelerator 63. The engine rotational speed sensor S45 detects the rotational speed of the engine 45 (more specifically, the rotational speed of the crankshaft 25 of the engine 45). The throttle opening sensor S65 detects the opening of the throttle valve 65. The output shaft rotational speed sensor S42 detects the rotational speed of the drive shaft 42, i.e., the output shaft of the transmission mechanism 43. The gear position sensor S43 detects the gear position of the transmission mechanism 43. The vehicle speed sensor S23 detects the vehicle speed of the motorcycle 1. In the present preferred embodiment, the vehicle speed sensor S23 is configured to detect the rotational speed of the rear wheel 23. The vehicle speed is detected based on the rotational speed of the rear wheel 23. However, the method of detecting the vehicle speed is not particularly limited.

The shift switch 30, the accelerator opening sensor S63, the engine rotational speed sensor S45, the throttle opening sensor S65, the vehicle speed sensor S23, the output shaft rotational speed sensor S42, and the gear position sensor S43 are connected to the ECU 90. The ECU 90 receives signals from the shift switch 30, the accelerator opening sensor S63, the engine rotational speed sensor S45, the throttle opening sensor S65, the vehicle speed sensor S23, the output shaft rotational speed sensor S42, and the gear position sensor S43. The ECU 90 is also connected to the throttle drive actuator 37, the clutch actuator 60, the shift actuator 70, the ignition device 67, and the fuel supply system 66. The ECU 90 outputs control signals to the throttle drive actuator 37, the clutch actuator 60, the shift actuator 70, the ignition device 67, and the fuel supply system 66.

When the clutch 44 is disengaged during the gear shifting control process, a drive force is no longer transmitted to the rear wheel 23 since the torque of the engine 45 is lost. If the torque of the engine 45 is abruptly lost, the drive force transmitted to the rear wheel 23 is instantly lost. Such an abrupt loss of the drive force can be a shock that impairs the riding comfort for the rider. The automatic transmission apparatus 50 according to the present preferred embodiment reduces the above-mentioned shock when disengaging the clutch 44 in the gear shifting control process.

As illustrated in FIG. 3, the ECU 90 includes a shock reduction control unit 96 that starts to disengage the clutch 44 after reducing the opening of the throttle valve 65, in other words, after reducing the torque of the engine 45.

Figure 4:
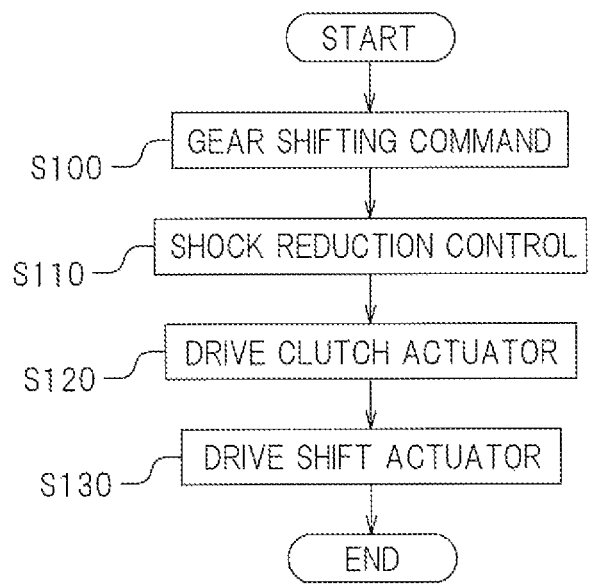
FIG. 4 is a flow chart illustrating the control process of an automatic transmission apparatus according to the first preferred embodiment of the present invention.
Figure 5:
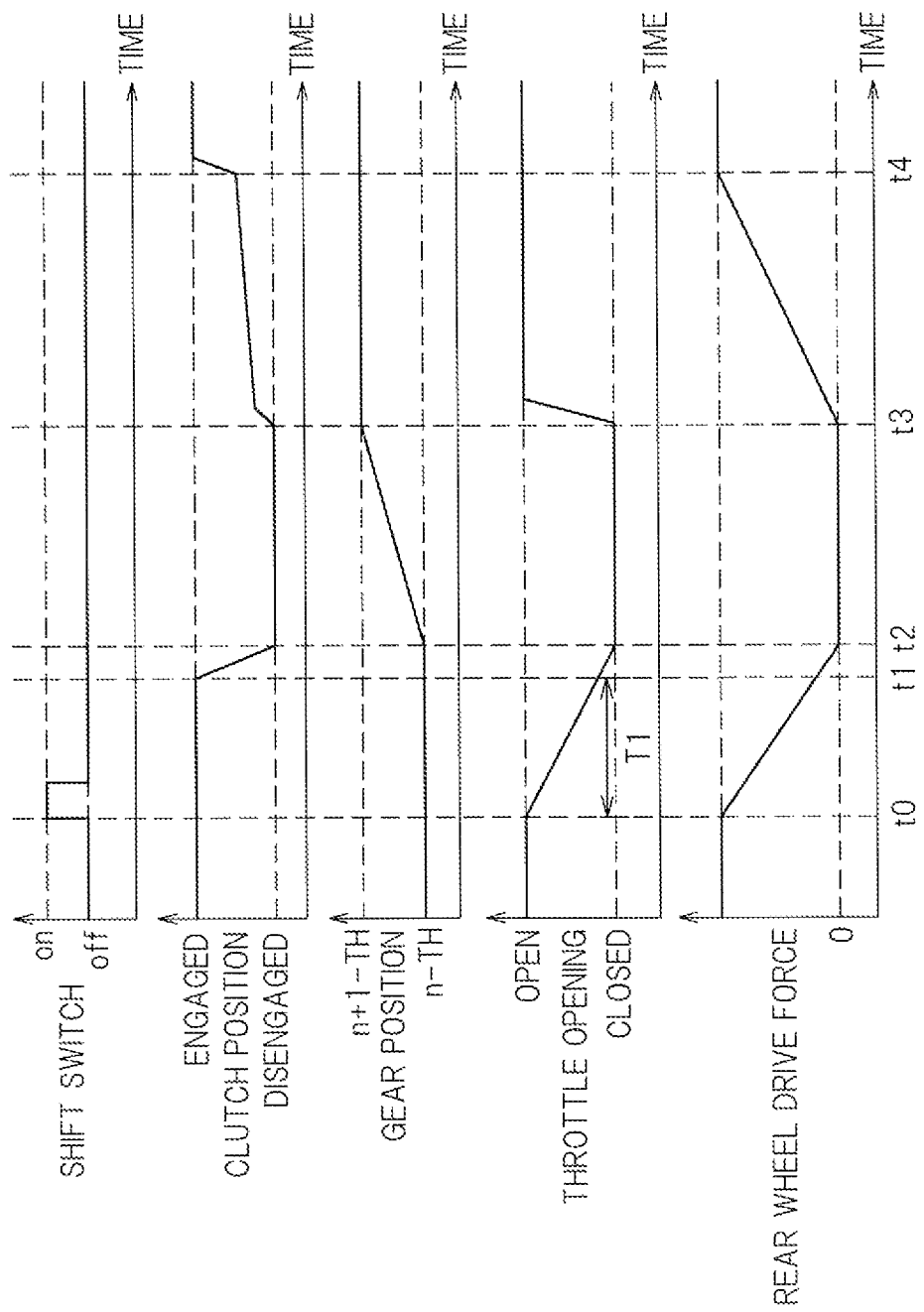
FIG. 5 is a chart showing changes over time of the clutch position, the gear position, the throttle opening, and the rear wheel driving force (torque) in a shock reduction control process according to the first preferred embodiment of the present invention.

Next, the control process of the automatic transmission apparatus 50 according to the present preferred embodiment will be described with reference to FIGS. 4 and 5. FIG. 4 is a flow chart illustrating the control process of the automatic transmission apparatus 50 according to the present preferred embodiment. FIG. 5 is a chart showing changes over time of the clutch position, the gear position, the throttle opening, and the torque of the rear wheel in the shock reduction control process according to the present preferred embodiment.

As illustrated in FIG. 4, first, at step S100, the rider presses the shift-up switch 30a (see FIG. 2) or the shift-down switch 30b (see FIG. 2), and as a result, the ECU 90 receives a gear shifting command signal. Referring to FIG. 5, the ECU 90 receives the gear shifting command at time t0. In the present preferred embodiment, a control process for upshifting when the rider presses the shift-up switch 30a will be described. A similar control process is executed for the control process for downshifting when the rider presses the shift-down switch 30b. Note that the shift-up switch 30a and the shift-down switch 30b preferably constitute the gear shifting command output device.

Next, at step S110 in FIG. 4 (time t0 onward in FIG. 5), the ECU 90 executes a shock reduction control process. Conventionally, the ECU 90 starts to disengage the clutch 44 after receiving the gear shifting command signal. In the present preferred embodiment, however, the shock reduction control process is executed before starting to disengage the clutch 44. This shock reduction control process is performed for the purpose of reducing the shock that impairs the riding comfort of the rider, which results from the abrupt loss of the torque of the engine 45 at the time of disengaging the clutch 44. The ECU 90 reduces the torque of the engine 45 by executing the shock reduction control process. The ECU 90 drives the throttle drive actuator 37 so as to reduce the opening of the throttle valve 65 before starting to disengage the clutch 44. The ECU 90 reduces the torque of the engine 45 by reducing the opening of the throttle valve 65, that is, by reducing the amount of the air flowing through the intake pipe 61 connected to the engine 45, before starting to disengage the clutch 44. As a result, the drive force of the rear wheel 23 is reduced.

When the operation amount of the accelerator 63 by the rider (hereinafter also referred to as the "accelerator operation amount") is greater at the time when the ECU 90 receives the gear shifting command signal, in other words, when the acceleration request by the rider is greater at that time, it means that the rider demands quicker acceleration. In this case, the riding comfort of the rider can be improved by shortening the gear shifting time. Accordingly, the shock reduction control process of the present preferred embodiment appropriately adjusts the time when starting to reduce the opening of the throttle valve 65 to when starting to disengage the clutch 44 (hereinafter also referred to as the "throttle opening decreasing time") according to the accelerator operation amount.

In the shock reduction control process, first, the ECU 90 detects the accelerator operation amount. The ECU 90 detects the accelerator operation amount using the accelerator opening sensor S63. Next, the ECU 90 determines whether a first reduction control process or a second reduction control process should be executed based on the detected accelerator operation amount. In the ECU 90, a predetermined amount of the accelerator operation amount is set to determine which of the control processes should be performed next, and the predetermined amount is stored in a memory or the like, which is not shown in the drawings, within the ECU. If the detected accelerator operation amount is equal to or greater than the predetermined amount, the ECU 90 determines that it is a second operation amount. On the other hand, if the detected accelerator operation amount is less than the predetermined amount, the ECU 90 determines that it is a first operation amount. If the accelerator operation amount is the first operation amount, the ECU 90 executes the first reduction control process next. On the other hand, if the accelerator operation amount is the second operation amount, the ECU 90 executes second first reduction control process next. Note that this determining control process is executed at time t0 in FIG. 5.

In the present preferred embodiment, the ECU 90 executes the first reduction control process if the accelerator operation amount is the first operation amount. The ECU 90 executes the second reduction control process if the accelerator operation amount is the second operation amount. Both the first reduction control process and the second reduction control process are the control process for reducing the opening of the throttle valve 65. However, they are different in throttle opening decreasing time. In the first reduction control process, the ECU 90 reduces the opening of the throttle valve 65 over the first time. On the other hand, in the second reduction control process, the ECU 90 reduces the opening of the throttle valve 65 over the second time.

Figure 6:
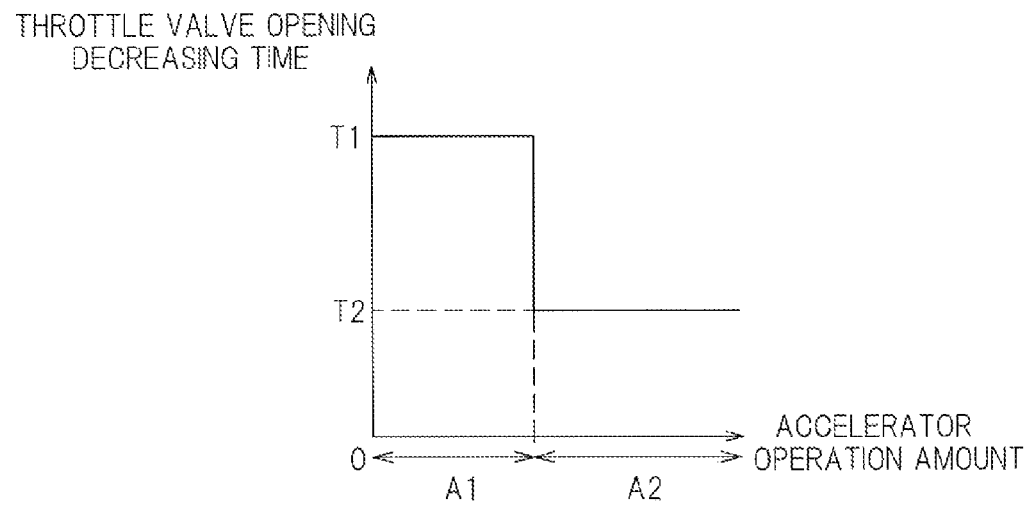
FIG. 6 is a graph illustrating the relationship between an accelerator operation amount, a first time of a first reduction control process, and a second time of a second reduction control process according to the first preferred embodiment of the present invention.

FIG. 6 is a graph illustrating the relationship between the accelerator operation amount, the first time of the first reduction control process, and the second time of the second reduction control process according to the present preferred embodiment. As illustrated in FIG. 6, if the accelerator operation amount is the first operation amount A1, the throttle opening decreasing time will be the first time T1. On the other hand, if the accelerator operation amount is the second operation amount A2, the throttle opening decreasing time will be the second time T2. The throttle opening decreasing time is shorter with the second time T2 than with the first time T1. Thus, in the present preferred embodiment, the throttle opening decreasing time is classified into two stages (the first time T1 and the second time T2) according to the accelerator operation amount. However, the throttle opening decreasing time may be classified into three or more stages or may be changed continuously according to the accelerator operation amount. It is also possible that the throttle opening decreasing time may not be classified according to the accelerator operation amount. When the throttle opening decreasing time is classified into two or more stages according to the accelerator operation amount, the function formula, map, table, or the like that represents the relationship between the accelerator operation amount and the throttle opening decreasing time is set in the ECU 90. The ECU 90 calculates the throttle opening decreasing time from the accelerator operation amount, using the function formula, map, table, or the like. Then, the ECU 90 reduces the opening of the throttle valve 65 over the calculated throttle opening decreasing time. The following discusses a case that the throttle opening decreasing time is classified into two stages according to the accelerator operation amount.

If it is determined that the accelerator operation amount is the first operation amount, the ECU 90 executes the first reduction control process. First, in the first reduction control process, the ECU 90 reduces the opening of the throttle valve 65 by driving the throttle drive actuator 37. In other words, the ECU 90 reduces the amount of the air flowing through the intake pipe 61. Then, the ECU 90 sets the time from when starting to reduce the opening of the throttle valve 65 to when starting to disengage the clutch 44 to be the first time T1. In FIG. 5, the time from time t0 to time t1 is the first time T1. In the first reduction control process, the opening of the throttle valve 65 is reduced at a constant rate over the first time T1. At this time, the torque of the engine 45 accordingly decreases. Then, according to the decrease of the torque of the engine 45, the drive force for the rear wheel 23 also decreases. In other words, according to the decrease of the opening of the throttle valve 65, the drive force for the rear wheel 23 also decreases. Note that the first time T1 is longer than the second time T2 in the later-described second reduction control process. In other words, when the accelerator operation amount is smaller, the ECU 90 reduces the opening of the throttle valve 65 over a longer time period than when the accelerator operation amount is greater.

On the other hand, if it is determined that the accelerator operation amount is the second operation amount, the ECU 90 executes the second reduction control process. First, in the second reduction control process, the ECU 90 reduces the opening of the throttle valve 65 by driving the throttle drive actuator 37, as in the first reduction control process. Then, the ECU 90 sets the time from when starting to reduce the opening of the throttle valve 65 to when starting to disengage the clutch 44 to be the second time T2. In the second reduction control process, the opening of the throttle valve 65 is reduced at a constant rate over the second time T2. The second time T2 is shorter than the first time T1. In other words, when the accelerator operation amount is greater, the ECU 90 reduces the opening of the throttle valve 65 over a shorter time period than when the accelerator operation amount is smaller. Thus, in the shock reduction control process of the present preferred embodiment, the first reduction control process or the second reduction control process, each of which has a different time of reducing the opening of the throttle valve 65, is executed according to the accelerator operation amount. This offers more desirable riding comfort to the rider. Note that in the present preferred embodiment, the throttle valve 65 and the throttle drive actuator 37 constitute the torque changing device. FIG. 5 is a chart depicting the first reduction control process. In the second reduction control process, the time from when starting to reduce the opening of the throttle valve 65 to when starting to disengage the clutch 44 is the second time T2, which is shorter than the first time T1 of the first reduction control process. Accordingly, when referring to FIG. 5, the first time T1 is replaced with the second time T2. In other respects, the second reduction control process is the same as the first reduction control process, and therefore the description referring to FIG. 5 will be omitted.

In the first reduction control process and the second reduction control process of the present preferred embodiment, the driving speed of the opening of the throttle valve 65 is made constant by driving the throttle drive actuator 37 at a constant speed. However, the driving speed of the throttle drive actuator 37 may not be constant, and the driving speed of the opening of the throttle valve 65 may be changed in a stepwise manner, for example.

In addition, the ECU 90 may reduce the opening of the throttle valve 65 at different rates when executing the first reduction control process and the second reduction control process. When executing the first reduction control process, that is, when the operation amount of the accelerator 63 is the first operation amount, the ECU 90 controls the rate of closing the opening of the throttle valve 65 to be a first rate. On the other hand, when executing the second reduction control process, that is, when the operation amount of the accelerator 63 is the second operation amount that is greater than the first operation amount, the ECU 90 controls the rate of closing the opening of the throttle valve 65 to be a second rate. The second rate is slower than the first rate. By executing such a control process, the speed of reducing the opening of the throttle valve 65 is made slower when executing the second reduction control process than when executing the first reduction control process. Note that when executing the first reduction control process and the second reduction control process, the ECU 90 may use with the first time and the second time, respectively, and also reduce the opening of the throttle valve 65 at the first rate and the second rate, respectively.

Figure 7:
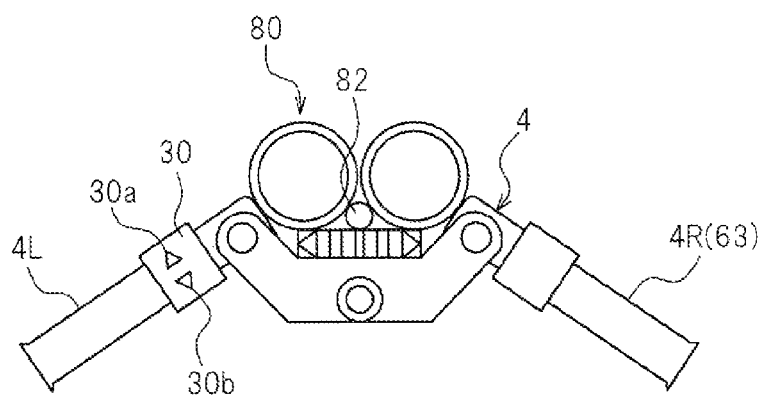
FIG. 7 is a view illustrating a notification device according to the first preferred embodiment of the present invention.

The ECU 90 may notify the rider that the gear shifting control process will be executed later (hereafter also referred to as a "gear shifting advance sign") before executing the shock reduction control process. FIG. 7 is a view illustrating a notification device according to the present preferred embodiment. As illustrated in FIG. 7, an instrument panel 80 is provided in front of and between a right handle bar 4R and a left handlebar 4L of the motorcycle 1. The motorcycle 1 includes an advance sign indicator lamp 82 in the instrument panel 80. In the present preferred embodiment, the advance sign indicator lamp 82 constitutes the notification device. The ECU 90 notifies the rider of an advance sign of gear shifting by lighting up the advance sign indicator lamp 82 before executing the shock reduction control process. In the present preferred embodiment, the ECU 90 visually notifies the rider of the advance sign of gear shifting by lighting up the advance sign indicator lamp 82. However, the ECU 90 may carry out the notification by blinking the advance sign indicator lamp 82. The advance sign indicator lamp 82 is not limited to being provided in the instrument panel 80. For example, the advance sign indicator lamp 82 may be provided outside the instrument panel 80 (for example, at any position the right handle bar 4R and the left handlebar 4L at which the rider can recognize visually). The advance sign indicator lamp 82 may be such an indicator as to visually indicate a message when starting the gear shifting control process. In place of using the advance sign indicator lamp 82, the notification device may notify the rider auditorily or physically of the advance sign of gear shifting by sound or vibration.

As illustrated in FIG. 4, after executing the shock reduction control process in step S110, the ECU 90 drives the clutch actuator 60 at step S120 to start to disengage the clutch 44. Referring to FIG. 5, the ECU 90 drives the clutch actuator 60 to start to disengage the clutch 44 at time t1. Then, at time t2, the disengagement of the clutch 44 is completed. In the ECU 90, a predetermined time for the reception of the gear shifting command to the start of disengaging the clutch 44 is set. The ECU 90 starts to disengage the clutch 44 after the predetermined time has elapsed. It is preferable that the predetermined time be the first time T1 in the first reduction control process. It is preferable that the predetermined time be the second time T2 in the second reduction control process.

Referring to FIG. 4, at step S130, after starting to disengage the clutch 44 at step S120, the ECU 90 drives the shift actuator 70 so as to start changing the gear position of the transmission mechanism 43. The ECU 90 allows the shift drum 421 to rotate by applying a voltage to the shift actuator 70, to change the gear position of the transmission mechanism 43. Referring to FIG. 5, at time 2, at which the disengagement of the clutch 44 is completed, the ECU 90 changes the gear position of the transmission mechanism 43 from the n-th gear to the n+1-th gear.

The actuation of the shift actuator 70 at step S130 in FIG. 4 may be carried out either at the same time as the actuation of the clutch actuator 60 at step S120 or after the driving of the clutch actuator 60. The actuation of the shift actuator 70 at step S130 may be carried out after the completion of disengagement of the clutch 44. Referring to FIG. 5, the ECU 90 may change the gear position of the transmission mechanism 43 either at the same time as the start of disengaging the clutch 44 at time t1 or between time t1 and time t2, in other words, during the disengaging of the clutch 44.

Referring to FIG. 5, at time t2, the disengagement of the clutch 44 is completed, and the throttle valve 65 is also closed. When the disengagement of the clutch 44 is completed, the torque of the engine 45 to be transmitted to the crankshaft 25 is lost, so the drive force for the rear wheel 23 is made zero. Note that in the present preferred embodiment, the reduction of the accelerator opening has been completed at time t2, at which the disengagement of the clutch 44 is completed. However, it is possible that the reduction of the throttle opening may be completed earlier than time t2.

As illustrated in FIG. 5, after the changing of the gear position of the transmission mechanism 43 has been completed at step S130 of FIG. 4 (time t3), the ECU 90 drives the clutch actuator 60 so that the clutch 44 will be in a half-clutch position, and also controls the throttle drive actuator 37 so as to increase the opening of the throttle valve 65. By increasing the opening of the throttle valve 65, the torque of the engine 45 accordingly increases, and the drive force for the rear wheel 23 also increases during the time from time t3 to time t4. Then, at time t4, the ECU 90 allows the clutch 44 to move from the half-clutch position to an engaged state. Thereafter, the engagement of the clutch 44 is completed, and the control process of the automatic transmission apparatus 50 ends.

The ECU 90 functions as a reduction control determining unit 96a shown in FIG. 3 when executing the process for determining whether to execute the first reduction control process of or the second reduction control process in step S110. In addition, the ECU 90 functions a first reduction control unit 96b and a second reduction control unit 96c shown in FIG. 3 when executing the first reduction control process and the second reduction control process in step S110. The control process of step S110 performs the functions of the shock reduction control unit 96. The ECU 90 includes the shock reduction control unit 96 arranged and programmed to disengage the clutch 44 and changing the gear position of the transmission mechanism 43 after reducing the opening of the throttle valve 65. The shock reduction control unit 96 includes the reduction control determining unit 96a to determine whether to execute the first reduction control process or the second reduction control process, the first reduction control unit 96b arranged and programmed to execute the first reduction control process, and the second reduction control unit 96c arranged and programmed to execute the second reduction control process.

As described above, in the present preferred embodiment, the ECU 90 reduces the torque of the engine 45 by controlling the throttle drive actuator 37 after receiving the gear shifting command. After the torque of the engine 45 has been reduced, the shock reduction control unit 96 of the ECU 90 executes the control process of starting to disengage the clutch 44 by controlling the clutch actuator 60. By the shock reduction control unit 96, the torque of the engine 45 is reduced and also the drive force for the rear wheel 23 is also reduced before disengaging the clutch 44. Therefore, the difference in the drive force for the rear wheel 23 before and after disengaging the clutch 44 can be kept small. Accordingly, it is possible to prevent the abrupt loss of the drive force at the time of disengaging the clutch 44. As a result, the shock at the time of disengaging the clutch 44 can be alleviated.

In the present preferred embodiment, the shock reduction control unit 96 of the ECU 90 controls the clutch actuator 60 so as to start to change the gear position of the transmission mechanism 43 at the same time as starting to disengage the clutch 44. Therefore, the torque of the engine 45 can be reduced by the shock reduction control unit 96 before changing the gear position.

In the present preferred embodiment, the shock reduction control unit 96 controls the throttle drive actuator 37 to reduce the opening of the throttle valve 65. The shock reduction control unit 96 reduces the torque of the engine 45 by reducing the opening of the throttle valve 65. Thus, the ECU 90 can reduce the torque of the engine 45 by reducing the opening of the throttle valve 65 and adjusting the air intake amount to the engine 45.

According to the present preferred embodiment, the ECU 90 executes the first reduction control process of setting the time from when starting to reduce the opening of the throttle valve 65 to when starting to disengage the clutch 44 to be the first time, if the operation amount of the accelerator 63 is the first operation amount when receiving the gear shifting command. On the other hand, the ECU 90 executes the second reduction control process of setting the time from when starting to reduce the opening of the throttle valve 65 to when starting to disengage the clutch 44 to be the second time that is shorter than the first time, if the operation amount of the accelerator 63 is the second operation amount that is greater than the first operation amount when receiving the gear shifting command. This makes it possible to appropriately change the time from when starting to reduce the opening of the throttle valve 65 to when starting to disengage the clutch 44 according to the operation amount of the accelerator 63 operated by the rider. In addition, when the operation amount of the accelerator 63 is greater, the just-mentioned time becomes shorter, so the gear shifting time can be made shorter.

As illustrated in FIG. 7, in the present preferred embodiment, the ECU 90 causes the advance sign indicator lamp 82 in the instrument panel 80 to light up when the shock reduction control unit 96 executes the shock reduction control process. By lighting up the advance sign indicator lamp 82, the ECU 90 notifies the rider that the gear shifting control process is performed. This allows the rider to recognize the advance sign of gear shifting visually.

Furthermore, the present preferred embodiment can provide a motorcycle 1 equipped with the automatic transmission apparatus 50 as described above that can significantly reduce the shock at the time of disengaging the clutch 44. Since the motorcycle 1 is light in weight, the rider easily feels the shock at the time of disengaging the clutch 44. For this reason, when the motorcycle 1 is equipped with the automatic transmission apparatus 50 as described above, it is possible to offer better riding comfort to the rider more effectively.

Thus, the motorcycle 1 according to the first preferred embodiment has been described hereinabove. It should be noted that the straddle-type vehicle according to the present invention is not limited to the motorcycle 1 of the present preferred embodiment, but may be embodied in various other types of preferred embodiments. Next, another preferred embodiment will be described briefly.

In the present preferred embodiment, the ECU 90 executes the shock reduction control process immediately after receiving the gear shifting command. Thereafter, the ECU 90 performs disengaging of the clutch 44 and changing of the gear position of the transmission mechanism 43. However, the ECU 90 may start to disengage the clutch 44 without executing the shock reduction control process immediately after receiving the gear shifting command, depending on the accelerator operation amount.

Figure 8:
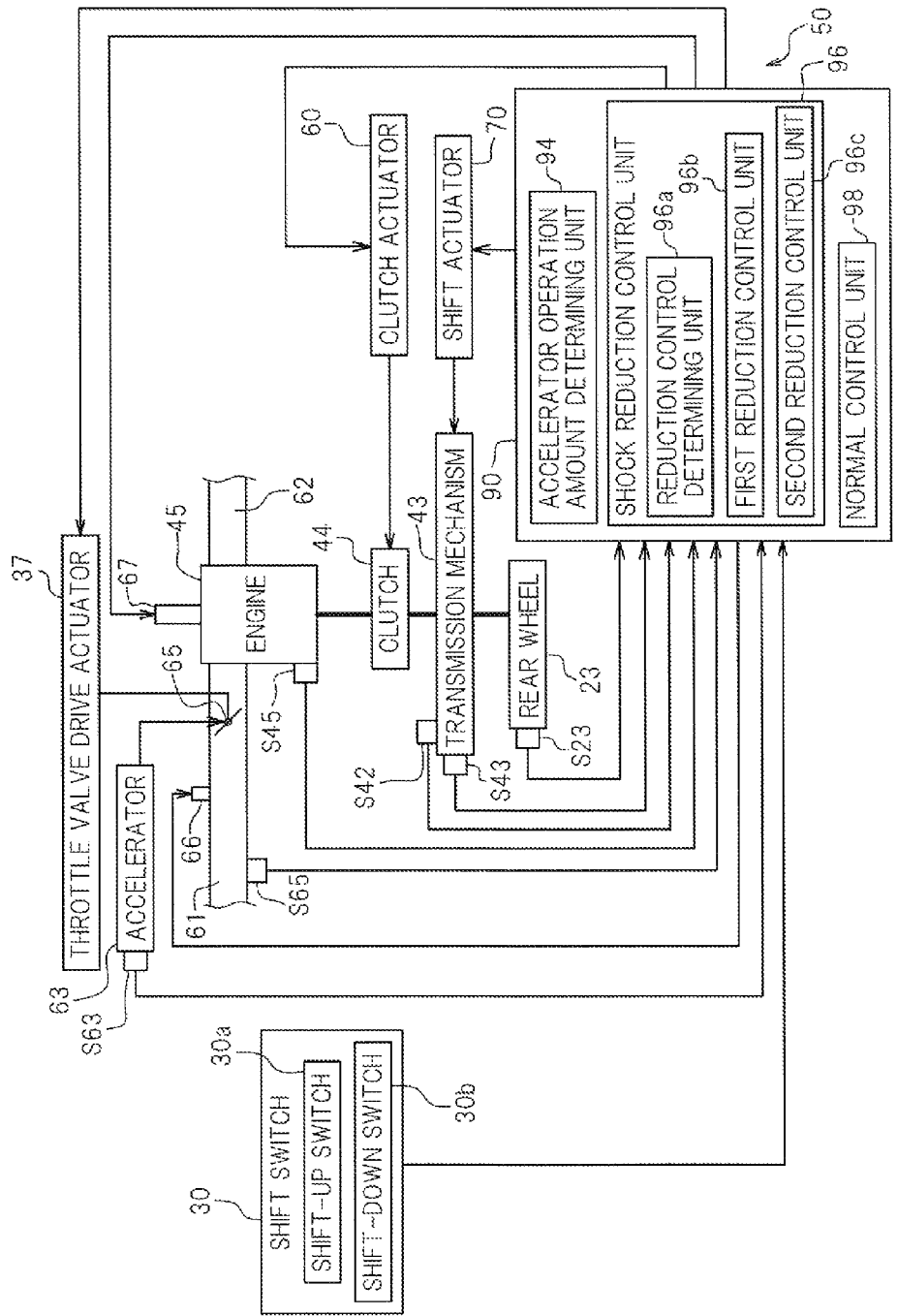
FIG. 8 is a block diagram illustrating main elements of the motorcycle according to a second preferred embodiment of the present invention.

Next, the second preferred embodiment will be described. In the present preferred embodiment, the same elements as in the first preferred embodiment are designated by the same reference numerals and will not be further elaborated upon. FIG. 8 is a block diagram illustrating main elements of the motorcycle 1 according to the second preferred embodiment. As illustrated in FIG. 8, the ECU 90 of the present preferred embodiment further includes an accelerator operation amount determining unit 94 and a normal control unit 98. The accelerator operation amount determining unit 94 executes a control process of detecting the accelerator operation amount of the accelerator 63 and determining which control process should be executed next based on the detected accelerator operation amount. The normal control unit 98 executes a control process of reducing the opening of the throttle valve 65 at the same time as starting to disengage the clutch 44.

Figure 9:
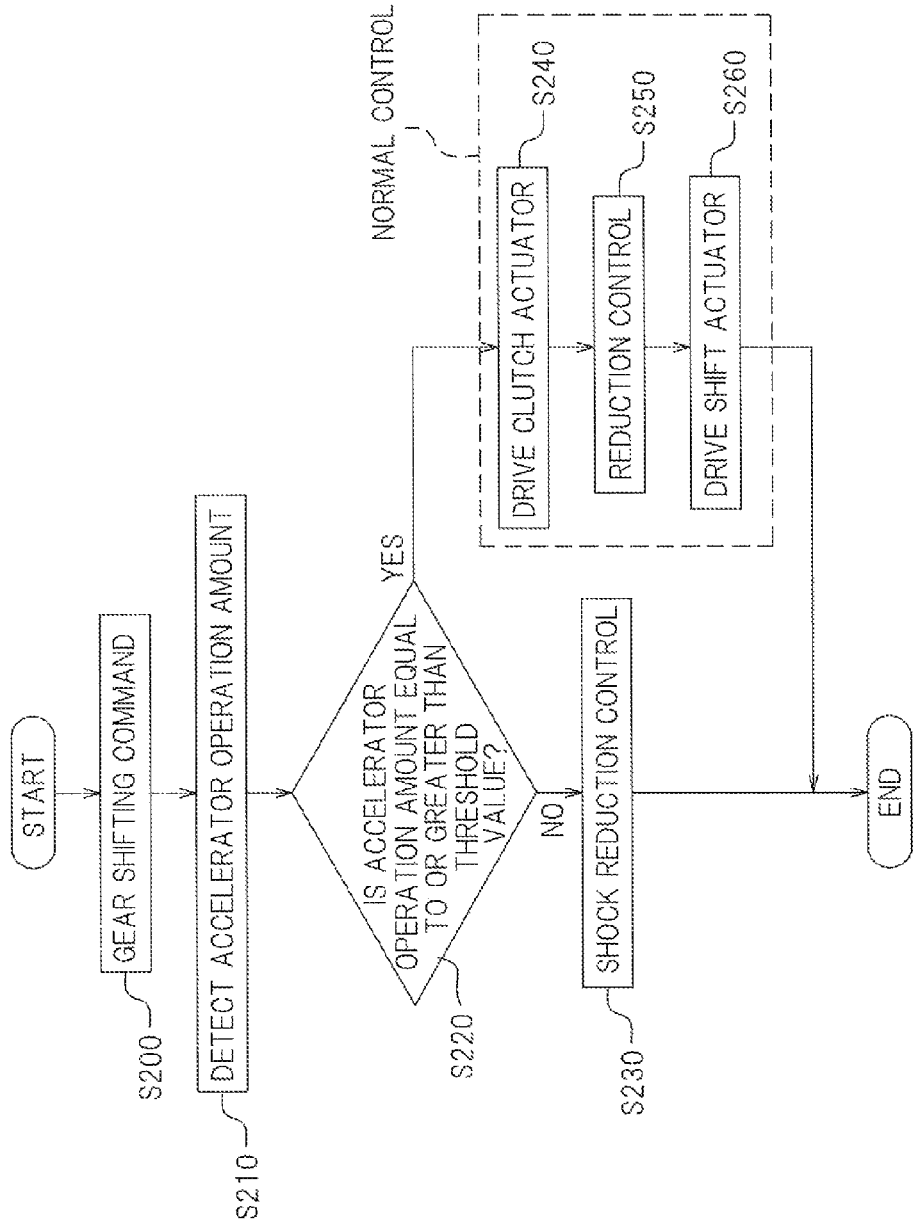
FIG. 9 is a flow chart illustrating the control process of an automatic transmission apparatus according to the second preferred embodiment of the present invention.
Figure 10:
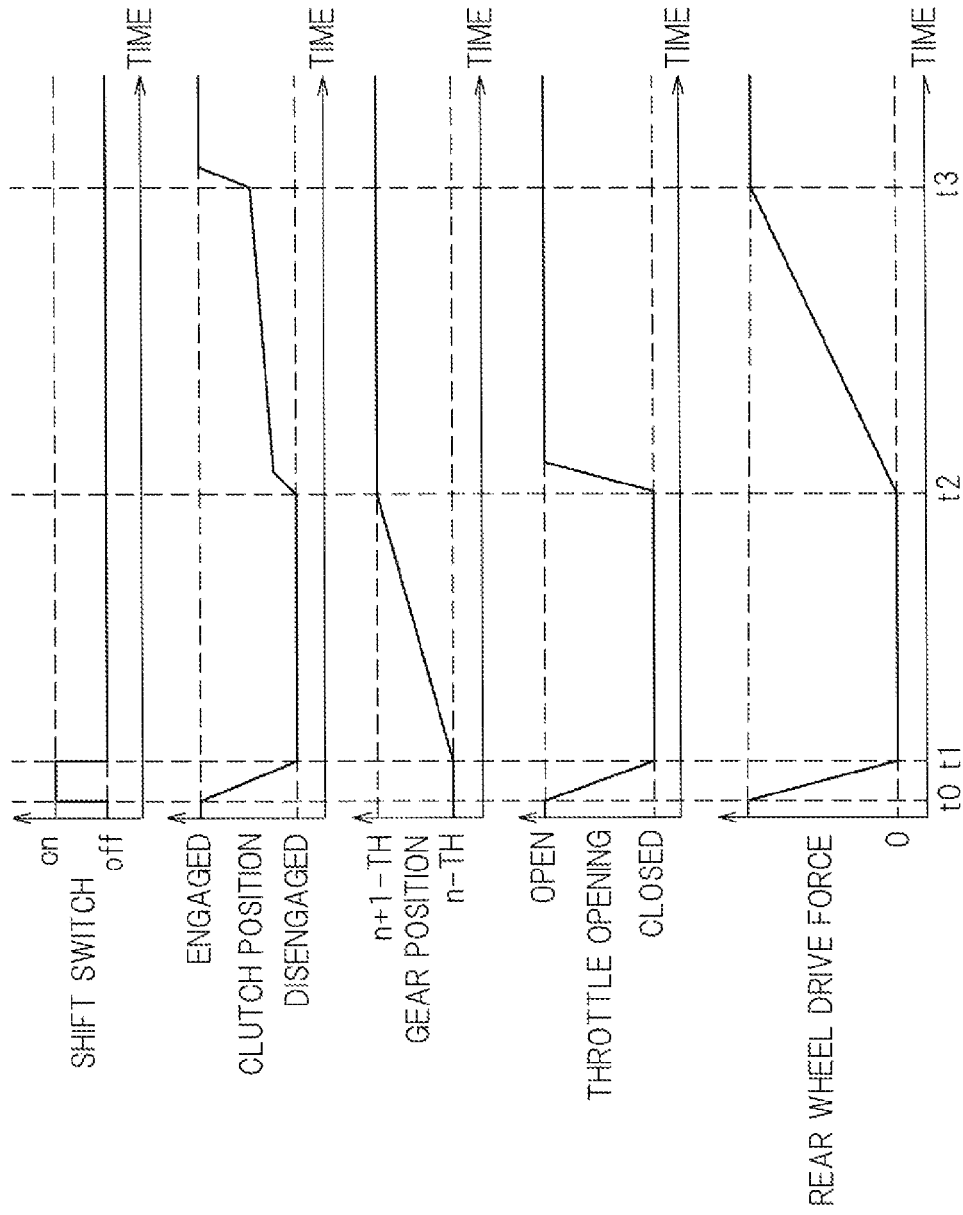
FIG. 10 is a chart showing changes over time of the clutch position, the gear position, the throttle opening, and the rear wheel driving force in a normal control process according to the second preferred embodiment of the present invention.

Next, the control process of the automatic transmission apparatus 50 according to the present preferred embodiment will be described with reference to FIGS. 9 and 10. FIG. 9 is a flow chart illustrating the control process of the automatic transmission apparatus 50 according to the second preferred embodiment. FIG. 10 is a chart showing changes over time of the clutch position, the gear position, the throttle opening, and the rear wheel driving force in a normal control process according to the second preferred embodiment.

As illustrated in FIG. 9, at step S200 (at time t0 in FIG. 10), the ECU 90 receives the gear shifting command. Next, at step S210, the ECU 90 detects the accelerator operation amount. The ECU 90 detects the operation amount of the accelerator 63 by the rider, using the accelerator opening sensor S63. It is preferable that this detection of the accelerator operation amount in step S210 be performed at the same time as when the ECU 90 receives the gear shifting command in step S200, in other words, at time t0 in FIG. 10. However, it is also possible to perform the detection of the accelerator operation amount in step S210 immediately after receiving the gear shifting command.

When the operation amount of the accelerator 63 by the rider is greater, in other words, when the acceleration request by the rider is greater, it means that the rider demands quicker acceleration, so the ECU 90 makes the gear shifting time shorter. By making the gear shifting time shorter, better riding comfort for the rider is attained. For this reason, it is preferable that if the accelerator operation amount is great, the shock reduction control process, in other words, the control process of reducing the opening of the throttle valve 65, should not be executed before starting to disengage the clutch 44. Accordingly, at step S220 in FIG. 9, the ECU 90 determines whether to execute the shock reduction control process or the later-described normal control process next, based on the accelerator operation amount detected in step S210. More specifically, in the ECU 90, a threshold value of the accelerator operation amount is set in advance, for determining whether to execute the shock reduction control process or the normal control process next. The just-mentioned threshold value is stored in a memory, which is not shown in the drawings, within the ECU 90. Then, the ECU 90 compares the accelerator operation amount detected in step S210 with the just-mentioned threshold value. If the detected accelerator operation amount is equal to or greater than the threshold value, the ECU 90 judges that the rider wants to make the gear shifting time shorter. For this reason, the ECU 90 determines that the normal control process should be executed next. On the other hand, if the accelerator operation amount is less than the threshold value, the ECU 90 judges that the rider prefers to reduce the shock that impairs the riding comfort, which results from the abrupt loss of the torque of the engine 45 at the time of disengaging the clutch 44, rather than to make the gear shifting time shorter. For this reason, the ECU 90 determines that the shock reduction control process should be executed next. If it is determined that the normal control process should be executed, the process proceeds to step S240. On the other hand, if it is determined that the shock reduction control process should be executed, the process proceeds to step S230.

The shock reduction control process of step S230 is identical to the shock reduction control process in the first preferred embodiment, and therefore the description thereof will be omitted. It should be noted, however, that although the determination according to the accelerator operation amount (i.e., the determination of the reduction control determining unit 96a as to whether to execute the first reduction control process or the second reduction control process) is performed in the shock reduction control process, the determination of the reduction control determining unit 96a may be performed at the same time as the determination control of step S220.

If it is determined in step S220 that the accelerator operation amount is equal to or greater the threshold value, the ECU 90 makes the time for the gear shifting control process shorter. Accordingly, in order to execute the normal control process without executing the shock reduction control process, the ECU 90 performs step S240 shown in FIG. 9. At step 240, first, the ECU 90 starts to disengage the clutch 44 by driving the clutch actuator 60 (time t0 in FIG. 10).

Thereafter, at step S250, the ECU 90 executes a normal reduction control process. The ECU 90 drives the throttle drive actuator 37 so as to reduce the opening of the throttle valve 65. Then, as illustrated in FIG. 10, from time t0 to time t1, the ECU 90 reduces the torque of the engine 45 by reducing the opening of the throttle valve 65 at a constant rate, that is, by reducing the amount of the air flowing through the intake pipe 61 connected to the engine 45 at a constant rate. As the opening of the throttle valve 65 decreases, the torque of the engine 45 accordingly decreases. According to the decrease of the torque of the engine 45, the drive force for the rear wheel 23 also decreases. Then, at time t1, the disengagement of the clutch 44 is completed. When the disengagement of the clutch 44 is completed, the friction plates 445 (see FIG. 2) and the clutch plates 449 (see FIG. 2) of the clutch 44 are separated from each other, so that the drive force transmitted to the rear wheel 23 is made zero. In the present preferred embodiment, the opening of the throttle valve 65 is reduced at the same time as starting to disengage the clutch 44. However, the opening of the throttle valve 65 may be reduced after starting to disengage the clutch 44.

Subsequently, at step S260 in FIG. 9, the ECU 90 drives the shift actuator 70 so as to start changing the gear position of the transmission mechanism 43. Note that in the present preferred embodiment, the actuation of the shift actuator 70 at step S260 preferably is performed after the reduction control process of step 250. The actuation of the shift actuator 70 at step S260 may be carried out either at the same time as the actuation of the clutch actuator 60 at step S240 or immediately after step S240. Referring to FIG. 10, the actuation of the shift actuator 70 is carried out after the disengagement of the clutch 44 is completed at time t1. However, the actuation of the shift actuator 70 may be carried out either at the same time as starting to disengage the clutch 44 at time t0 or in the middle of disengaging the clutch 44, from time t0 to time t1. The control processes at time t2 and at time t3 in FIG. 10 are the same as those of the shock reduction control process in the first preferred embodiment (time t3 and time t4 in FIG. 5), and therefore the description thereof will be omitted.

The ECU 90 functions as the accelerator operation amount determining unit 94 when executing the processes of step S210 and step S220. In addition, the ECU 90 functions as the normal control unit 98 for the control process of a series of flow of step S240, step 250, and step S260. The ECU 90 of the present preferred embodiment includes the accelerator operation amount determining unit 94 arranged to determine which control process should be executed according to the accelerator operation amount, the shock reduction control unit 96 arranged and programmed to start to disengage the clutch 44 after reducing the opening of the throttle valve 65, and the normal control unit 98 arranged and programmed to reduce the opening of the throttle valve 65 at the time of starting to disengage the clutch 44.

According to the present preferred embodiment, the ECU 90 determines whether or not the accelerator operation amount is equal to or greater than a threshold value when receiving the gear shifting command, using the accelerator operation amount determining unit 94. Then, if it is determined that the accelerator operation amount is equal to or greater than the threshold value, the ECU 90 executes the normal control process of reducing the torque of the engine 45 at the same time as starting to disengage the clutch 44. Thus, when the acceleration request by the rider is great, the ECU 90 executes the normal control process, so that the gear shifting time can be shortened.

In the first preferred embodiment and the second preferred embodiment, the shock reduction control process by the shock reduction control unit 96 of the ECU 90 is such that it is determined whether to execute the first reduction control process or the second reduction control process according to the magnitude of the accelerator operation amount. The first reduction control unit 96b and the second reduction control unit 96c reduce the opening of the throttle valve 65 over the first time and the second time, respectively, and/or at the first rate and the second rate, respectively. However, the configurations of the first reduction control unit 96b and the second reduction control unit 96c are not limited to the above-described configurations. The first reduction control unit 96b and the second reduction control unit 96c of the shock reduction control unit 96 may be a first reduction control unit 96b and a second reduction control unit 96c of a shock reduction control unit 96 according to the third preferred embodiment as shown in the following.

Next, the third preferred embodiment will be described. In the present preferred embodiment, the same elements as in the foregoing preferred embodiments are designated by the same reference numerals and will not be further elaborated upon. In the control process of the first reduction control unit 96b and the second reduction control unit 96c of the shock reduction control unit 96 according to the present preferred embodiment, the opening that the throttle valve 65 reaches when starting to disengage the clutch 44 (hereinafter also referred to as the "end-point opening") is varied. When the ECU 90 receives the gear shifting command from the shift switch 30, the first reduction control unit 96b executes a control process by setting the end-point opening of the throttle valve 65 to be a first opening from when starting to reduce the opening of the throttle valve 65 to when starting to disengage the clutch 44. On the other hand, the second reduction control unit 96c executes a control process by setting the end-point opening of the throttle valve 65 to be a second opening, which is greater than the first opening, from when starting to reduce the opening of the throttle valve 65 to when starting to disengage the clutch 44. Thus, the end-point opening of the throttle valve 65 in the second reduction control process is greater than the end-point opening of the throttle valve 65 in the first reduction control process.

Figure 11:
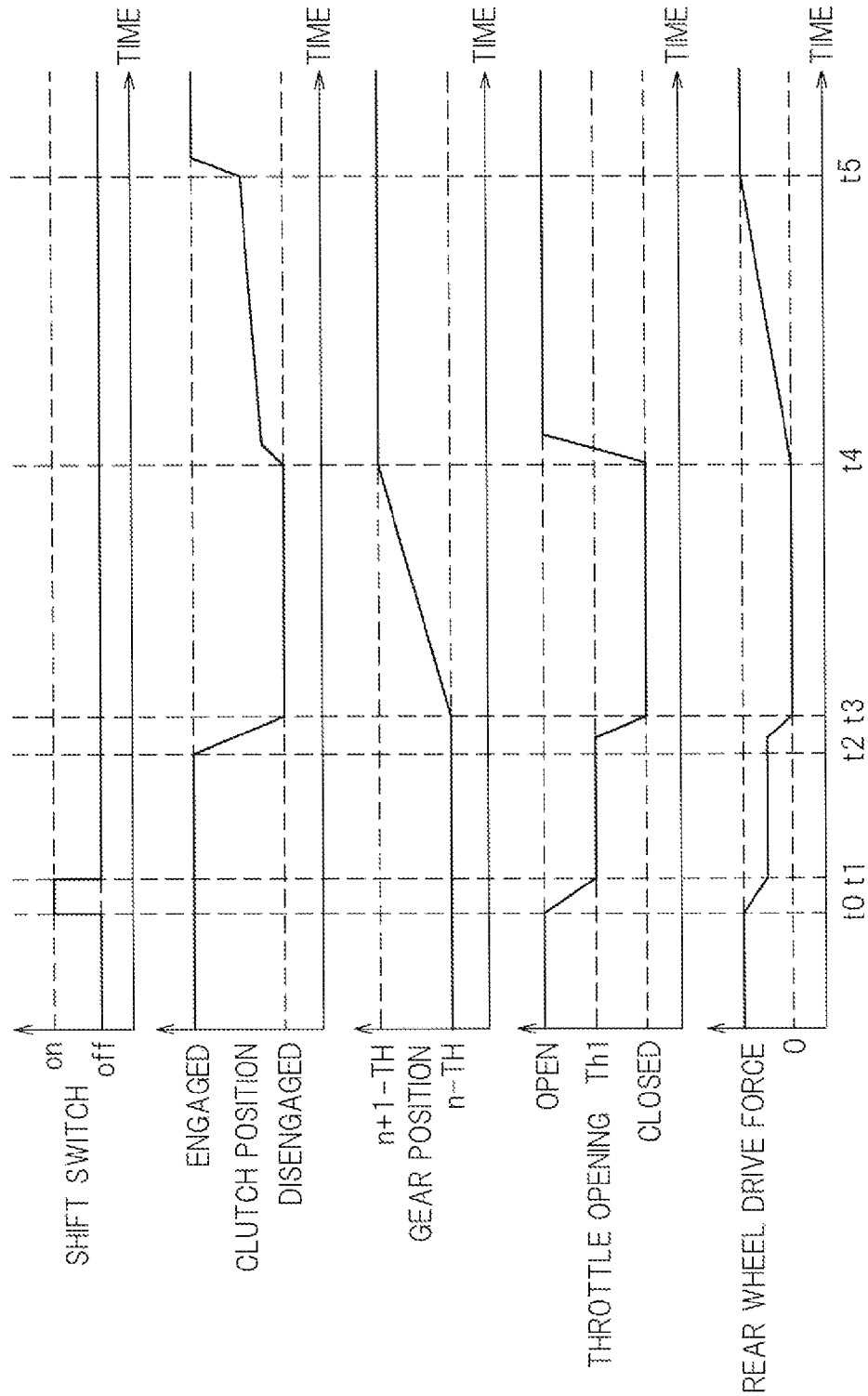
FIG. 11 is a chart showing changes over time of the clutch position, the gear position, the throttle opening, and the rear wheel driving force in a shock reduction control process according to a third preferred embodiment of the present invention.

FIG. 11 is a chart showing changes over time of the clutch position, the gear position, the throttle opening, and the rear wheel drive force (torque) in the shock reduction control process according to the present preferred embodiment. Here, the processes other than the process of the shock reduction control unit 96 are the same as those in the first and second preferred embodiments, and therefore the description thereof will be omitted. Note that FIG. 11 depicts the first reduction control process of the shock reduction control process. In the present preferred embodiment, the first reduction control process and the second reduction control process are the same control process, except that the opening that the throttle valve 65 reaches at the time of starting to disengage the clutch 44 is different, and therefore the description of the second reduction control process will be omitted.

As illustrated in FIG. 11, after receiving the gear shifting command at time t0, the ECU 90 executes the first reduction control process if the accelerator operation amount is small. On the other hand, if the accelerator operation amount is great, the ECU 90 executes the second reduction control process. Time t2 is the time at which the clutch 44 is started to disengage. From time t0 to time t2 in the first reduction control process, the ECU 90 drives the throttle drive actuator 37 so that the opening of the throttle valve 65 becomes an opening Th1 at time t1. At this time, since the throttle opening is closed, the torque of the engine 45 is accordingly reduced, and the drive force for the rear wheel 23 is accordingly reduced. Then, at time t1, when the opening of the throttle valve 65 reaches the opening Th1, the ECU 90 controls the throttle drive actuator 37 so that the opening of the throttle valve 65 becomes constant. The opening of the throttle valve 65 is constant between time t1 and time t2. As a result, the drive force of the rear wheel 23 is also made constant. Note that in the case of the second reduction control process, the opening of the throttle valve 65 is set to be an opening Th2, which is greater than the opening Th1. In other words, the end-point opening of the throttle valve 65 in the second reduction control process is greater than the end-point opening of the throttle valve 65 in the first reduction control process.

Then, at time t2, the ECU 90 drives the clutch actuator 60 to start to disengage the clutch 44. After starting to disengage the clutch 44, the ECU 90 controls the throttle drive actuator 37 to reduce the opening of the throttle valve 65. At this time, as the torque of the engine 45 decreases, the drive force for the rear wheel 23 accordingly decreases. Then, at time t3, the disengagement of the clutch 44 is completed. When the disengagement of the clutch 44 is completed, the friction plates 445s (see FIG. 2) and the clutch plates 449 (see FIG. 2) are separated from each other, so that the drive force transmitted to the rear wheel 23 is made zero.

The shock reduction control unit 96 with the above-described configuration makes it possible to appropriately change the opening that the throttle valve 65 reaches from when starting to reduce the opening of the throttle valve 65 to when starting to disengage the clutch 44 according to the acceleration request by the rider. When the acceleration request by the rider is greater, the rider demands quicker acceleration. Accordingly, when the acceleration request by the rider is greater, the opening that the throttle valve 65 reaches when starting to disengage the clutch 44 is set to be greater, so that abrupt reduction of the drive force can be prevented. It should be noted that the first reduction control process and the second reduction control process of the present preferred embodiment may be executed using the first opening and the second opening and, at the same, using the first time and the second time and/or the first rate and the second rate in the first preferred embodiment.

In the foregoing preferred embodiments, the shock reduction control unit 96 reduces the torque of the engine 45 by reducing the opening of the throttle valve 65. However, the configuration of the shock reduction control unit 96 is not limited to the above-described configuration. The shock reduction control unit 96 may be a shock reduction control unit 96 according to a fourth preferred embodiment, as shown in the following.

Next, the fourth preferred embodiment will be described. In the present preferred embodiment, the same elements as in the foregoing preferred embodiments are designated by the same reference numerals and will not be further elaborated upon. In the present preferred embodiment, the engine 45 is provided with the ignition device 67 (see FIG. 3), as in the foregoing preferred embodiments. The ignition device 67 is a device arranged to ignite fuel of the engine 45. The ignition device 67 is connected to the ECU 90. The ECU 90 outputs a signal to the ignition device 67. The shock reduction control unit 96 according to the present preferred embodiment reduces the torque of the engine 45 by performing an ignition timing retard control process for the ignition device 67 provided for the engine 45. When the ignition timing retard control process is executed for the ignition device 67, the rotational speed of the engine 45 can be reduced. By reducing the rotational speed of the engine 45, the torque of the engine 45 is accordingly reduced. Then, as the torque of the engine 45 decreases, the drive force for the rear wheel 23 accordingly decreases. Note that in the normal reduction control process of the normal control unit 98 in the second preferred embodiment as well, it is possible to reduce the torque of the engine 45 by executing the ignition timing retard control process.

In the shock reduction control unit 96 and the normal reduction control process of the normal control unit 98 in the present preferred embodiment, the torque of the engine 45 is reduced by performing the ignition timing retard control process for the ignition device 67. However, the shock reduction control unit 96 and the normal reduction control process of the normal control unit 98 may execute the control processes for the opening of the throttle valve 65 as in the foregoing preferred embodiments at the same time as executing the ignition timing retard control process.

Thus, the ECU 90 can reduce the torque of the engine 45 by executing the ignition timing retard control process for the ignition device 67. This makes it possible to prevent the abrupt loss of the drive force at the time of disengaging the clutch 44 more suitably. As a result, the shock at the time of disengaging the clutch 44 can be alleviated more suitably.

In the foregoing first to third preferred embodiments, the shock reduction control unit 96 reduces the torque of the engine 45 by reducing the opening of the throttle valve 65. In addition, in the fourth preferred embodiment, the shock reduction control unit 96 reduces the torque of the engine 45 by performing the ignition timing retard control process for the ignition device 67. However, the configuration of the shock reduction control unit 96 is not limited to the above-described configuration. The shock reduction control unit 96 may be a shock reduction control unit 96 according to a fifth preferred embodiment, as shown in the following.

Next, the fifth preferred embodiment will be described. In the present preferred embodiment, the same elements as in the foregoing preferred embodiments are designated by the same reference numerals and will not be further elaborated upon. In the present preferred embodiment, the engine 45 is provided with the fuel supply system 66 (see FIG. 3), as in the foregoing preferred embodiments. The fuel supply system 66 is connected to the ECU 90. The ECU 90 outputs a signal to the fuel supply system 66. The shock reduction control unit 96 according to the present preferred embodiment reduces the torque of the engine 45 by controlling the fuel supply amount of the fuel supply system 66 provided for the engine 45. The ECU 90 reduces the torque of the engine 45 by reducing the fuel supply amount of the fuel supply system 66. Then, since the torque of the engine 45 decreases, the drive force for the rear wheel 23 accordingly decreases. It is also possible that the shock reduction control unit 96 of the ECU 90 may control the torque of the engine 45 by controlling the fuel supply timing of the fuel supply system 66. In this case, the ECU 90 reduces the torque of the engine 45 by delaying the fuel supply timing of the fuel supply system 66. According to the decrease of the torque of the engine 45, the drive force for the rear wheel 23 also decreases. In the normal reduction control process of the normal control unit 98 in the second preferred embodiment as well, it is also possible to control the torque of the engine 45 by controlling the fuel supply amount or the fuel supply timing of the fuel supply system 66.

In the shock reduction control unit 96 and the normal reduction control process of the normal control unit 98 in the present preferred embodiment, the torque of the engine 45 is controlled by controlling the fuel supply system 66. However, the shock reduction control unit 96 and the normal reduction control process of the normal control unit 98 may be implemented by controlling the opening of the throttle valve 65 as in the first to third preferred embodiments and/or controlling the ignition device 67 in the fourth preferred embodiment, at the same time as controlling the fuel supply system 66.

Thus, in the present preferred embodiment, the torque of the engine 45 can be reduced before disengaging the clutch 44 by controlling the fuel supply amount or fuel supply timing of the fuel supply system 66. This makes it possible to prevent the abrupt loss of the drive force at the time of disengaging the clutch 44 more suitably. As a result, the shock at the time of disengaging the clutch 44 can be alleviated more suitably.

In the foregoing preferred embodiments, the gear shifting command preferably is sent to the ECU 90 by the rider's manual operation of the upshifting switch 30*a* or the downshifting switch 30*b* of the shift switch 30. However, the ECU 90 may output a gear shifting command according to the driving condition of the motorcycle 1. Specifically, the ECU 90 outputs a gear shifting command by detecting, for example, the vehicle speed, the rotational speed of the engine 45, and/or the gear position of the transmission mechanism 43.

The ECU 90 issues a gear shifting command based on the driving condition of the motorcycle 1 so that gear shifting is performed irrespective of the intention of the rider. Nevertheless, with the above-described configuration, the ECU 90 reduces the torque of the engine 45 before disengaging the clutch 44, so it is possible to inform the rider of an advance sign of gear shifting. By receiving the advance sign, the rider can prepare for the gear shifting in advance. As a result, the rider can easily obtain a connected feel with the vehicle.

In the foregoing preferred embodiments, the ECU 90 preferably executes the reduction determining control of the accelerator operation amount determining unit 94 and the shock reduction control unit 96 based on the operation amount of the accelerator 63. However, as illustrated in FIG. 3, the ECU 90 may carry out the reduction control determination of the accelerator operation amount determining unit 94 and the shock reduction control unit 96 using at least one information including the accelerator operation amount, the rotational speed of the engine 45 detected by the engine rotational speed sensor S45, the opening of the throttle valve 65 detected by the throttle opening sensor S65, the vehicle speed detected by the vehicle speed sensor S23, the output shaft rotational speed of the transmission mechanism 43 detected by the output shaft rotational speed sensor S42, and the gear position of the transmission mechanism 43 detected by the gear position sensor S43.

In the foregoing preferred embodiments, the clutch actuator 60 and the shift actuator 70 preferably are provided separately. However, instead of providing the clutch actuator 60 and the shift actuator 70 separately, it is also possible to provide a single actuator to drive both the clutch 44 and the transmission mechanism 43.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An automatic transmission apparatus comprising:
    a clutch including a drive side rotator to which engine torque is transmitted and a driven side rotator arranged to contact with and separate from the drive side rotator;
    a multi-gear transmission mechanism including a dog clutch and disposed between the driven side rotator of the clutch and a driving wheel of a straddle-type vehicle;
    at least one actuator arranged to drive the clutch and the multi-gear transmission mechanism;
    a torque changing device arranged to change the engine torque;
    a gear shifting command output device arranged to output a gear shifting command; and
    a transmission control system arranged and programmed to control the at least one actuator and the torque changing device, the transmission control system including a shock reduction control unit arranged and programmed to execute a control process to, upon receiving the gear shifting command from the gear shifting command output device, reduce the engine torque by controlling the torque changing device and thereafter to start to disengage the clutch by controlling the at least one actuator.

2. The automatic transmission apparatus according to claim 1, wherein the shock reduction control unit controls the at least one actuator so as to start to change a gear position of the multi-gear transmission mechanism at the same time as or after starting to disengage the clutch.

3. The automatic transmission apparatus according to claim 1, wherein:
    the torque changing device includes an electronic throttle valve provided for the engine; and
    the shock reduction control unit reduces the engine torque by reducing an opening of the electronic throttle valve.

4. The automatic transmission apparatus according to claim 3, wherein:
    the straddle-type vehicle includes an accelerator operator to be operated by a rider; and
    the shock reduction control unit is arranged and programmed to:
        set a time from when starting to reduce the opening of the electronic throttle valve to when starting to disengage the clutch to be a first time, if an operation amount of the accelerator operator is a first operation amount when receiving the gear shifting command from the gear shifting command output device; and
        set the time from when starting to reduce the opening of the electronic throttle valve to when starting to disengage the clutch to be a second time that is shorter than the first time, if the operation amount of the accelerator operator is a second operation amount that is greater than the first operation amount when receiving the gear shifting command.

5. The automatic transmission apparatus according to claim 3, wherein:
    the straddle-type vehicle includes an accelerator operator to be operated by a rider; and
    the shock reduction control unit is arranged and programmed to:
        reduce the opening of the electronic throttle valve at a first rate, if an operation amount of the accelerator operator is a first operation amount when receiving the gear shifting command from the gear shifting command output device; and
        reduce the opening of the electronic throttle valve at a second rate that is lower than the first rate, if the operation amount of the accelerator operator is a second operation amount that is greater than the first operation amount when receiving the gear shifting command.

6. The automatic transmission apparatus according to claim 3, wherein:
    the straddle-type vehicle includes an accelerator operator to be operated by a rider; and
    the shock reduction control unit is arranged and programmed to:
        set an opening that the electronic throttle valve reaches from when starting to reduce the opening of the electronic throttle valve to when starting to disengage the clutch to be a first opening, if an operation amount of the accelerator operator is a first operation amount when receiving the gear shifting command from the gear shifting command output device; and
        set the opening that the electronic throttle valve reaches from when starting to reduce the opening of the electronic throttle valve to when starting to disengage the clutch to be a second opening that is greater than the first opening, if the operation amount of the accelerator operator is a second operation amount that is greater than the first operation amount when receiving the gear shifting command.

7. The automatic transmission apparatus according to claim 1, wherein:
    the straddle-type vehicle includes an accelerator operator to be operated by a rider; and
    the transmission control system includes:
        a determining unit arranged to determine whether or not an operation amount of the accelerator operator is equal to or greater than a threshold value when receiving the gear shifting command from the gear shifting command output device; and
        a normal control unit arranged and programmed to execute a normal control process to, upon receiving the gear shifting command from the gear shifting command output device, reduce the engine torque by the torque changing device at the same time as or after starting to disengage the clutch; and
    the transmission control system executes the normal control process using the normal control unit instead of the control process using the shock reduction control unit, if the determining unit determines that the operation amount is equal to or greater than the threshold value.

8. The automatic transmission apparatus according to claim 1, wherein:
    the torque changing device includes an ignition device provided in the engine; and the shock reduction control unit reduces the engine torque by performing an ignition timing retard control process for the ignition device.

9. The automatic transmission apparatus according to claim 1, wherein:
   the torque changing device includes a fuel supply system arranged to supply fuel to the engine; and
   the shock reduction control unit reduces the engine torque by controlling a fuel supply amount or fuel supply timing of the fuel supply system.

10. The automatic transmission apparatus according to claim 1, wherein the gear shifting command output device includes a control device arranged and programmed to output the gear shifting command according to a driving condition of the straddle-type vehicle.

11. The automatic transmission apparatus according to claim 10, further comprising a notification device arranged to provide notification by one of visual indication, sound, or vibration when the shock reduction control unit executes the control process.

12. A straddle-type vehicle comprising:
   an automatic transmission apparatus according to claim 1.

\* \* \* \* \*